(12) United States Patent
MacKinnon et al.

(10) Patent No.: US 7,897,691 B2
(45) Date of Patent: *Mar. 1, 2011

(54) PROTON EXCHANGE MEMBRANES FOR FUEL CELL APPLICATIONS

(75) Inventors: Sean M MacKinnon, West Henrietta, NY (US); Timothy J. Fuller, Pittsford, NY (US); Frank Coms, Fairport, NY (US); Michael R. Schoeneweiss, W. Henrietta, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 264 days.

This patent is subject to a terminal disclaimer.

(21) Appl. No.: 12/197,530

(22) Filed: Aug. 25, 2008

(65) Prior Publication Data

US 2009/0281245 A1 Nov. 12, 2009

Related U.S. Application Data

(60) Provisional application No. 61/052,158, filed on May 9, 2008.

(51) Int. Cl.
C08F 214/14 (2006.01)

(52) U.S. Cl. .................... 525/326.2; 526/250; 526/252; 526/253; 526/254

(58) Field of Classification Search .............. 525/326.2; 526/250, 252, 253, 254
See application file for complete search history.

(56) References Cited

U.S. PATENT DOCUMENTS

| | | | |
|---|---|---|---|
| 5,021,602 A | 6/1991 | Clement et al. | |
| 5,037,917 A | 8/1991 | Babb et al. | |
| 5,066,746 A | 11/1991 | Clement et al. | |
| 5,159,037 A | 10/1992 | Clement et al. | |
| 5,159,038 A | 10/1992 | Babb et al. | |
| 5,316,871 A | 5/1994 | Swathirajan et al. | |
| 5,910,378 A | 6/1999 | Debe et al. | |
| 6,124,060 A | 9/2000 | Akita et al. | |
| 6,183,668 B1 | 2/2001 | Debe et al. | |
| 6,277,512 B1 | 8/2001 | Hamrock et al. | |
| 6,384,167 B2 | 5/2002 | DesMarteau et al. | |
| 6,444,343 B1 | 9/2002 | Prakash et al. | |
| 6,521,381 B1 | 2/2003 | Vyas et al. | |
| 6,523,699 B1 | 2/2003 | Akita et al. | |
| 6,559,237 B1 | 5/2003 | Mao et al. | |
| 6,670,065 B2 | 12/2003 | Koyama et al. | |
| 6,847,518 B2 | 1/2005 | Fukuda et al. | |
| 6,875,537 B2 | 4/2005 | Tani et al. | |
| 6,926,984 B2 | 8/2005 | Asano et al. | |
| 6,933,068 B2 | 8/2005 | Asano et al. | |
| 6,953,653 B2 * | 10/2005 | Smith et al. ............... 430/321 |
| 6,986,962 B2 | 1/2006 | Oyanagi et al. | |
| 7,001,929 B2 | 2/2006 | Goto et al. | |
| 7,045,241 B2 | 5/2006 | Akita et al. | |
| 7,094,851 B2 | 8/2006 | Wu et al. | |
| 2001/0018144 A1 | 8/2001 | Watakabe et al. | |
| 2002/0014405 A1 | 2/2002 | Arcella et al. | |
| 2003/0017379 A1 | 1/2003 | Menashi | |
| 2003/0096149 A1 | 5/2003 | Koyama et al. | |
| 2003/0180596 A1 | 9/2003 | Yoshimura et al. | |
| 2004/0214058 A1 | 10/2004 | Tada et al. | |
| 2004/0214065 A1 | 10/2004 | Kanaoka et al. | |
| 2005/0014927 A1 | 1/2005 | Akita | |
| 2005/0043487 A1 | 2/2005 | Felix et al. | |
| 2005/0048342 A1 | 3/2005 | Wakahoi et al. | |
| 2005/0053810 A1 | 3/2005 | Kato et al. | |
| 2005/0058864 A1 | 3/2005 | Goebel | |
| 2005/0064260 A1 | 3/2005 | Otsuki et al. | |
| 2005/0100770 A1 | 5/2005 | Sugawara et al. | |
| 2005/0106440 A1 | 5/2005 | Komiya | |
| 2005/0116206 A1 | 6/2005 | Kakuta et al. | |
| 2005/0130024 A1 | 6/2005 | Otsuki et al. | |
| 2005/0142397 A1 | 6/2005 | Wakahoi et al. | |
| 2005/0143530 A1 | 6/2005 | Iwadate et al. | |
| 2005/0175886 A1 | 8/2005 | Fukuda et al. | |
| 2005/0197467 A1 | 9/2005 | Komiya et al. | |
| 2005/0227138 A1 | 10/2005 | Fukuda et al. | |
| 2005/0233181 A1 | 10/2005 | Wariishi et al. | |
| 2005/0260474 A1 | 11/2005 | Asano et al. | |
| 2006/0019147 A1 | 1/2006 | Fukuda et al. | |
| 2006/0127728 A1 | 6/2006 | Otsuki et al. | |
| 2006/0177719 A1 | 8/2006 | Fuller et al. | |
| 2007/0042242 A1 | 2/2007 | Tada et al. | |
| 2007/0099054 A1 | 5/2007 | Fuller et al. | |
| 2007/0141237 A1 | 6/2007 | Okiyama et al. | |
| 2008/0027152 A1 | 1/2008 | Maier et al. | |
| 2009/0278083 A1 | 11/2009 | Fuller et al. | |

FOREIGN PATENT DOCUMENTS

JP    2003535929 T    12/2003

(Continued)

OTHER PUBLICATIONS

Budy, S.M. et al., "Facile preparation of fluorovinylene aryl ether telechelic polymers with dual functionality for thermal chain extension and tandem crossliking," Chem. Commun. 2006, pp. 4844-4846, 2006.

(Continued)

*Primary Examiner*—Bernard Lipman
(74) *Attorney, Agent, or Firm*—Brooks Kushman P.C.

(57) ABSTRACT

A proton conductive graft polymer comprises at least a structure unit of a sulfonated polymer side chain covalently attached to a hydrophobic perfluorocyclobutane polymer main chain. The sulfonated condensation polymer side chain has a high local ion exchange capacity while the main polymer chain is substantially free of sulfonic acid group. A membrane made from the graft polymer can provide good mechanical properties and high proton conductivity at wide range of humidity and temperatures.

12 Claims, 26 Drawing Sheets

FOREIGN PATENT DOCUMENTS

| | | | |
|---|---|---|---|
| JP | 2005129298 A | | 5/2005 |
| JP | 2005166557 A | | 6/2005 |
| JP | 2005179380 A | | 7/2005 |
| JP | 2009249487 | * | 4/2008 |
| JP | 2009249487 A | | 10/2009 |
| WO | 20041051776 | | 6/2004 |
| WO | 20071052954 A1 | | 5/2007 |

OTHER PUBLICATIONS

Li, Z. et al., A Novel Bisphenol Monomer with Grafting Capability and the Resulting Poly(arylene ether sulfone)s, Macromolecules 2006, 39, pp. 6990-6996.

Matsumura, S. et al., Iononners for Proton Exchange Membrane Fuel Cells with Sulfonic Acid Groups on the End Groups: Novel Branched Poly(eteher-ketone)s, Macromolecules 2008, 41, pp. 281-284.

Smith, D.W. et al., "Perfluorocyclobutane Aromatic Polyethers. Synthesis and Characterization of New Siloxane-Containing Fluoropolymers," Macromolecules 1996, v. 29, pp. 852-860.

Smith, D.W. et al., "Perfluorocyclobutane (PFCB) polyaryl ethers: versatile coatings material," J. of Fluorine Chem., v. 104, pp. 109-117 (2000).

Souzy, R. et al., "Functional fluoropolymers for fuel cell membranes," Solid State Ionics, v. 176, pp. 2839-2848 (2005).

Souzy, R. et al., "Functional fluoropolymers for fuel cell membranes," Prog. Polm. Sci. 30, 2005, pp. 644-687.

Ford, L.A. et al., "New Aromatic Perfluorovinyl Ether Monomers Containing the Sulfonimide Acid Functionality," Polymeric Materials Science & Eng., v. 83, 2000, pp. 10-11 (American Chemical Society).

Souzy, R. et al., "Synthesis and (co)polymerization of monofluoro, difluoro, trifluorostyrene and ((trifluorovinyl)oxy) benzene," Prog. Polm. Sci. 29 (2004), pp. 75-106.

* cited by examiner

PROTON EXCHANGE MEMBRANES FOR FUEL CELL APPLICATIONS

CROSS-REFERENCE TO RELATED APPLICATIONS

This application claims the benefit of U.S. provisional application Ser. No. 61/052,158 filed May 9, 2008.

TECHNICAL FIELD

The field to which the disclosure generally relates includes proton conductive graft polymers, fuel cell membranes and membrane electrode assemblies.

BACKGROUND

Proton conductive polymers have been used to make membranes and membrane electrode assemblies (MEA) for fuel cells. Many addition polymers and condensation polymers have been explored as proton conductive polymers for electrode membranes. To meet the requirement of high proton conductivity at low humidity and high operating temperatures, the polymer needs to have a high ion exchange capacity (IEC). A proton conductive polymer having high IEC, however, usually becomes water soluble or significantly swellable in water. As a result, an electrolyte membrane made from the polymers typically has poor mechanical properties under fuel cell operating conditions. There is thus a need to further improve the polymer composition and electrolyte membranes to provide both high IEC and good mechanical properties.

SUMMARY OF EXEMPLARY EMBODIMENTS OF THE INVENTION

The present invention solves one or more problems of the prior art by providing in at least one embodiment a polymer that is useful for fuel cell applications. The polymer of this embodiment comprises a polymer having polymer segments 1 and 2:

$$E_1—P_1—Q_1—P_2$$
$$|$$
$$R_8(Z_1)_d$$

1

$$E_2—P_3—Q_2—P_4$$

2 wherein:

$Z_1$ is a protogenic group such as $—SO_2X$, $—PO_3H_2$, $—COX$, and the like;

$E_1$, $E_2$ are each independently an aromatic-containing and/or aliphatic-containing moiety;

X is an $—OH$, a halogen, an ester, or

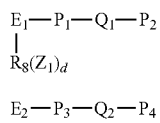

d is the number of $(SO_2X)_d$ attached to $E_1$;

$P_1$, $P_2$, $P_3$, $P_4$ are each independently: absent, $—O—$, $—S—$, $—SO—$, $—CO—$, $—SO_2—$, $—NH—$, $—NR_2—$, or $—R_3—$, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$R_8(Z_1)_d$ is a moiety having d number of protogenic groups; and $Q_1$, $Q_2$ are each independently a fluorinated cyclobutyl moiety.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

Figure 1:
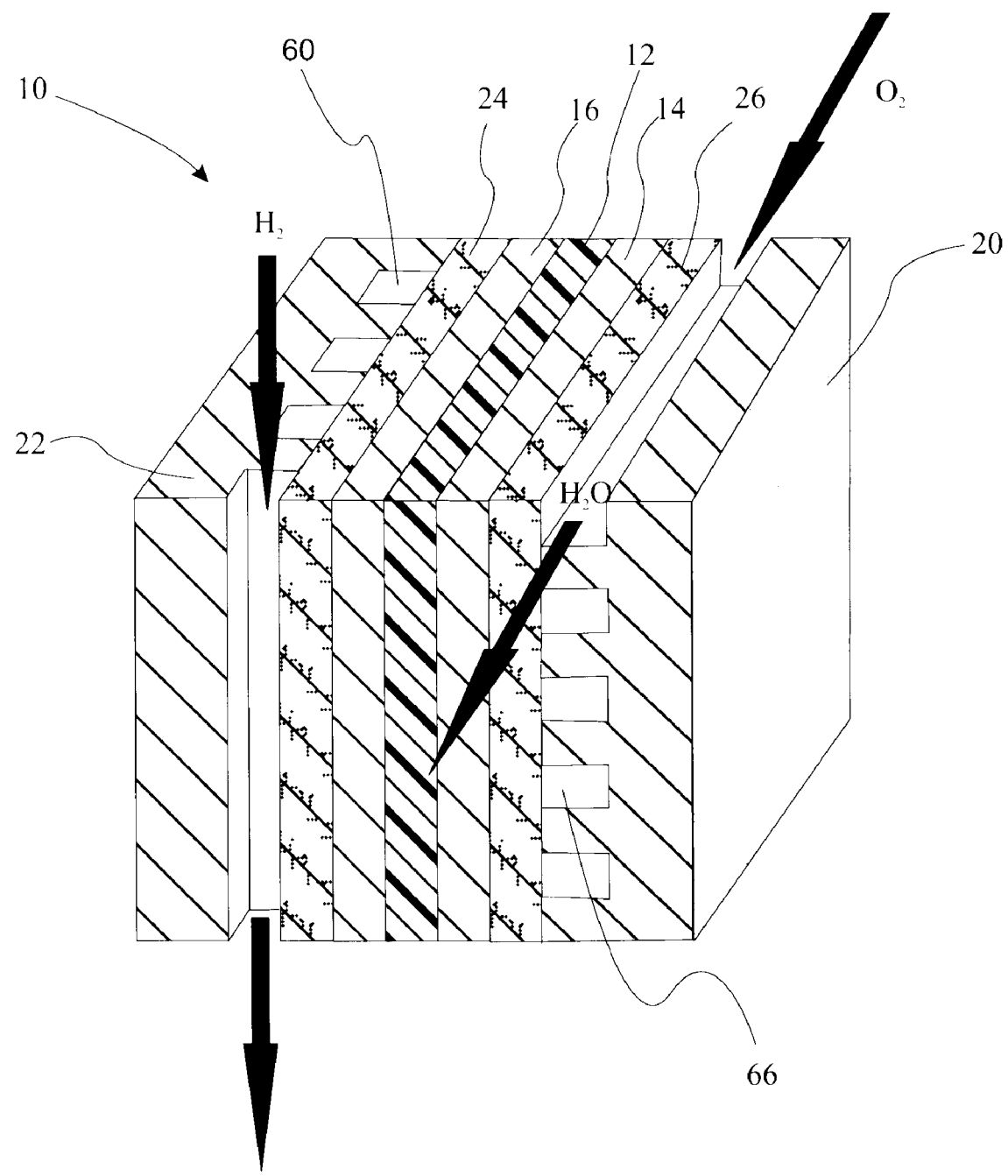
FIG. 1 provides a schematic illustration of a fuel cell incorporating the polymers of an embodiment of the present invention.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," "block," "random," "segmented block," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The following description of the embodiment(s) is merely exemplary in nature and is in no way intended to limit the invention, its application, or uses.

The term "block" as used herein means a portion of a macromolecule, comprising many constitutional units, that has at least one feature that is not present in adjacent portions.

The term "block macromolecule" as used herein means a macromolecule that is composed of blocks in linear sequence.

The term "block polymer" as used herein means a substance composed of block macromolecules.

The term "block copolymer" as used herein means a polymer in which adjacent blocks are constitutionally different, i.e., each of these blocks comprise constitutional units derived from different characteristic species of monomer or with different composition or sequence distribution of constitutional units.

The term "random copolymer" as used herein means a copolymer consisting of macromolecules in which the probability of finding a given repeating unit at any given site in the chain is independent of the nature of the adjacent units.

With reference to FIG. 1, a fuel cell that incorporates a polymer electrolyte including polymers from the invention is provided. PEM fuel cell 10 includes polymeric ion conductive membrane 12 disposed between cathode catalyst layer 14 and anode catalyst layer 16. Polymeric ion conductive membrane 12 includes one or more of the polymers set forth below. Fuel cell 10 also includes conductive plates 20, 22, gas channels 60 and 66, and gas diffusion layers 24 and 26.

In one variation, the present invention provides a proton conductive graft polymer to be incorporated into polymeric ion conductive membrane 12. In one refinement, the proton conductive graft polymer comprises at least a structure unit of a sulfonated side chain ("SCP") covalently attached to a hydrophobic perfluorocyclobutane main polymer chain. In another refinement of this variation, the main polymer chain is substantially free of sulfonic acid groups while the side chain has a high local concentration of sulfonic acid groups. When the graft polymer is formed into a thin membrane, the hydrophobic polymer main chain and the sulfonated side chain tend to segregate into at least two different interconnected domains—a hydrophobic perfluorocyclobutane main chain domain and a sulfonated proton conductive side chain domain. Although the Applicants do not wish to be bound by or to any particular theory, it is believed that the sulfonated side chain domain provides a highly conductive ionic channel while the hydrophobic perfluorocyclobutane main chain domain provides the overall mechanical properties. A membrane having such interconnected domains can synergistically provide both high ion exchange capacity and good mechanical properties in a wide range of humidity and temperature conditions.

In one embodiment of the present invention, a polymer composition that is useful for fuel cell applications comprises a polymer having polymer segments 1 and 2:

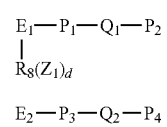

wherein:

$Z_1$ is a protogenic group such as $-SO_2X$, $-PO_3H_2$, $-COX$, and the like;

$E_1$, $E_2$ are each independently an aromatic-containing and/or aliphatic-containing moiety;

X is an $-OH$, a halogen, an ester, or

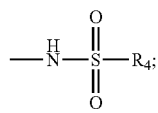

d is the number of $(Z_1)_d$ attached to $E_1$. In one refinement, d is equal to the number of aromatic rings in $E_1$. In another refinement, each aromatic ring in $E_1$ can have 0, 1, 2, 3, or 4 $Z_1$ groups. In still another refinement, d is an integer from 1 to 4 on average;

$P_1$, $P_2$, $P_3$, $P_4$ are each independently: absent, $-O-$, $-S-$, $-SO-$, $-CO-$, $-SO_2-$, $-NH-$, $NR_2-$, or $-R_3-$, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl, ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$R_8Z_{1d}$ is a moiety having d number of protogenic groups $Z_1$. In one variation $R_8$ is an aromatic group. In another variation, $R_8$ is an alkyl or fluoroalkyl group. Specific examples of fluoroalkly groups include $-(CF_2)_w-O-(CF_2)_y-Z_1$ where w is 1 to 12, p is 0-1, y is 1-12 and $-(CF_2CF(CF_3))_r-O_s-(CF_2)_t-Z_1$ where r is 0-1, s is 0-1, y is 1-12; and $Q_1$, $Q_2$ are each independently a fluorinated cyclobutyl moiety.

Specific examples for $Q_1$, $Q_2$ include, but are not limited to, the following moieties:

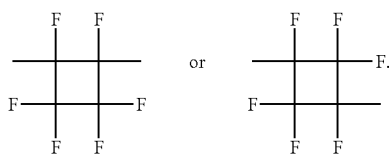

In a variation of the present embodiment, the polymer composition comprises a polymer having polymer units 3 and 4:

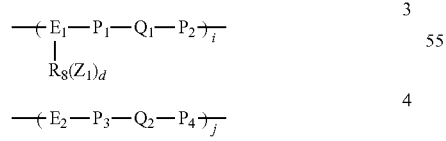

wherein:

i is a number representing the repetition of polymer segment 1 to define a polymer unit 3;

j is a number representing the repetition of polymer segment 2 to define polymer unit 4.

Polymer segments 1 and 2 and polymer units 3 and 4 may be incorporated into various types of polymers. For example, these moieties may be used to construct block copolymers, random copolymers, and the like. In a refinement of this variation, i and j are each independently from 1 to 400. In another refinement of this variation, i and j are each independently from 1 to 60. In still another refinement of this variation, i and j are each independently from 1 to 35. In yet another refinement of this variation, i and j are each independently from 5 to 60. In yet another refinement of this variation, i and j are each independently from 5 to 35. The following polymer section provides one example of such polymers:

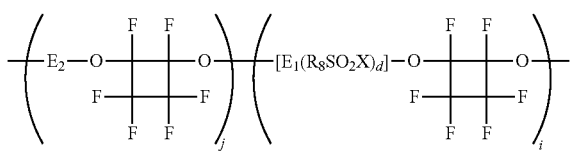

In a refinement of the present embodiment, $E_1$ and $E_2$ include one or more aromatic rings. For example, $E_1$ and $E_2$, include one or more of phenyl, biphenyl, triphenyl, terphenyl, naphthalenyl, phenanthrenyl, diphenyl ether, 9,9'-diphenylfluorene, diphenylsulfide, diphenylcyclohexyl methane, diphenyidimethylsilane, α-methylstilbene, hydroquinone diphenyl ether, sulfonated phenyl, α-methylstilbene, diphenylcyclohexyl methane or bisphenol A. In the polymers of the present embodiment, $E_1$ is typically different from $E_2$. It should be appreciated that in the case of $E_1$, a group will be substituted with $R_8(Z_1)_d$. Examples of $E_1$ and $E_2$ are described by the following structures:

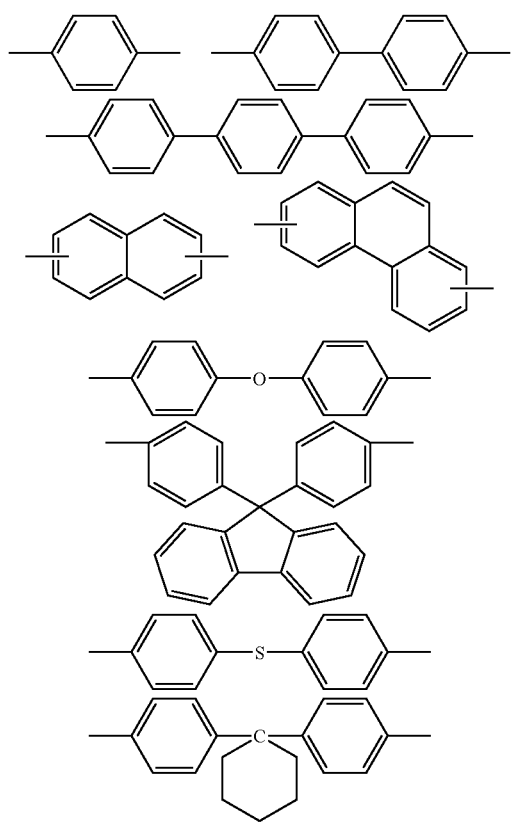

-continued

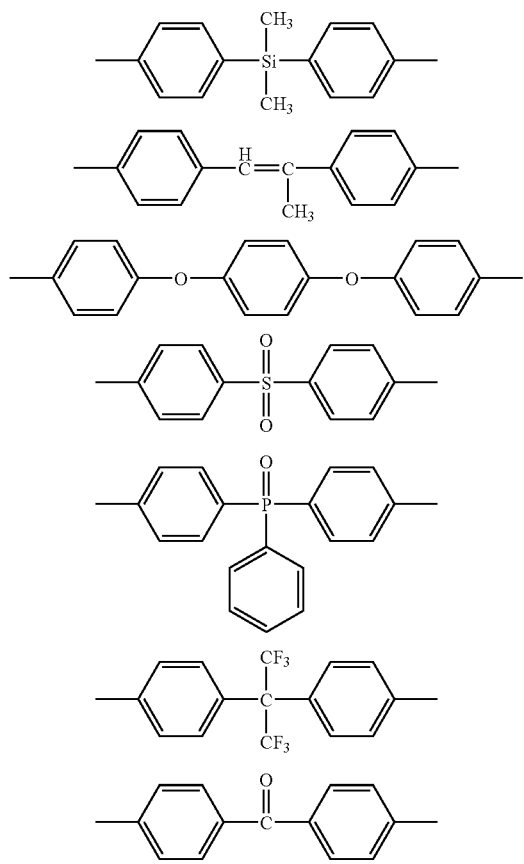

In another variation of the present embodiment, $E_1$ includes a segment represented by the following formulae:

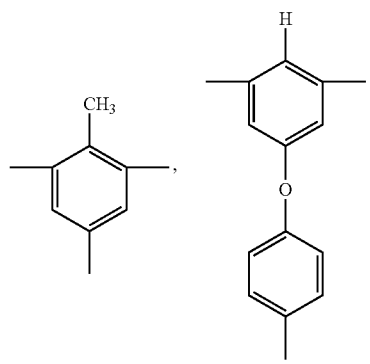

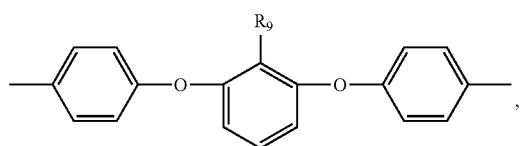

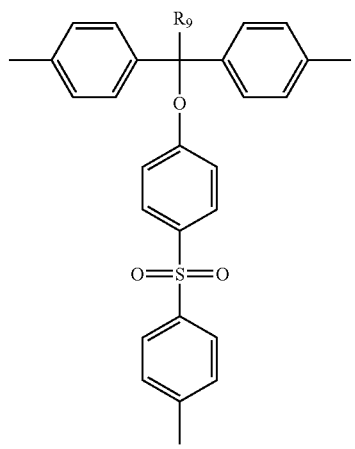

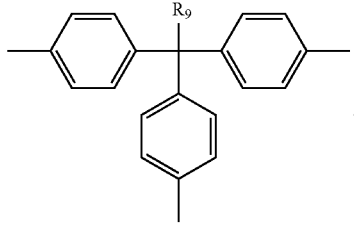

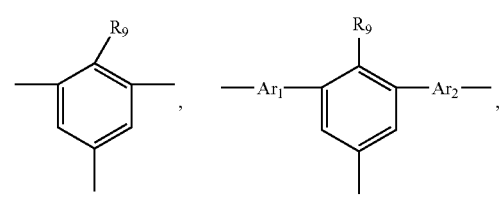

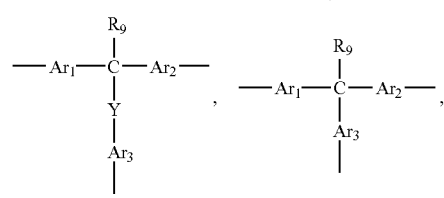

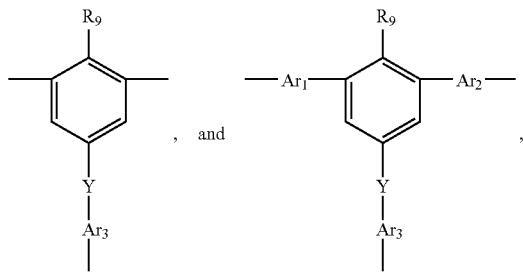

, and wherein $R_9$ is a hydrogen, an acyl or a haloacyl group, Ar1, Ar2 and Ar3 are each independently an aromatic group, and Y is one of sulfone, carbonyl, sulfur, oxygen, silicone, amide, and carbonate groups. Specific non-limiting examples of Ar group are shown in the following chemical formula:

The side group $R_8$ may be an organic group including a polymeric side chain group having at least one sulfonate or sulfonatable group. For example, the side group $R_8$ may comprise a structural unit represented by one of the following chemical formulas:

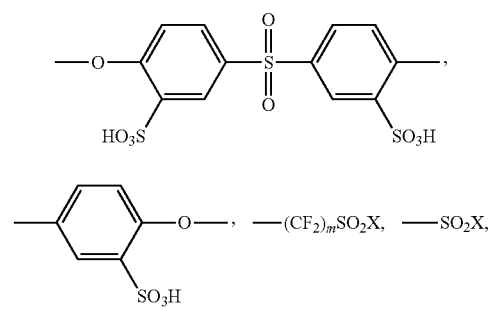
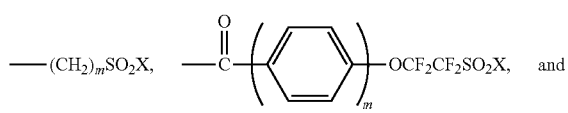
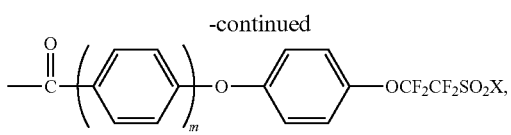
wherein m is a positive integer and X is an —OH, a halogen, an ester, or
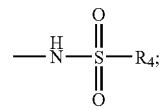
and $R_4$ is trifluoromethyl, $C_{1-25}$ alkyl, $C_{1-25}$ perfluoroalkylene, $C_{1-25}$ aryl, or another $E_1$ group. Typically, m is from 1 to 200. In particular, the side group $R_8$ comprises a chemical structural unit represented by one of the following chemical formulas:
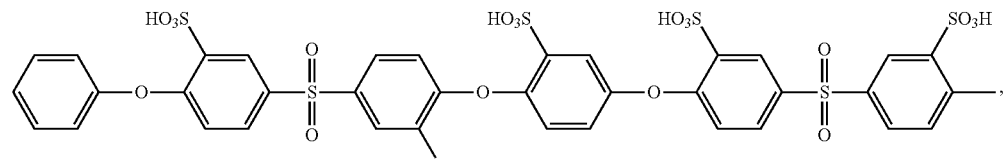
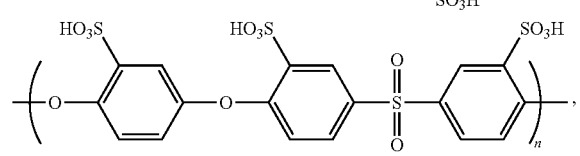
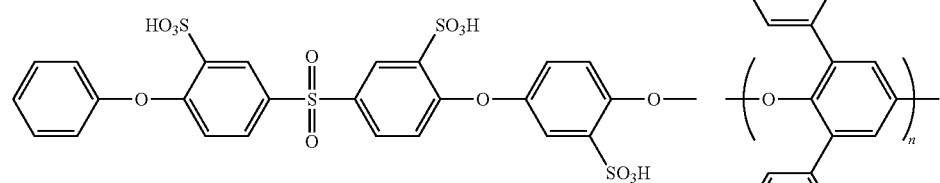
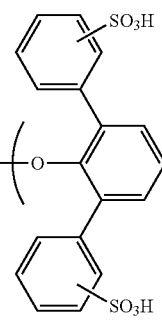
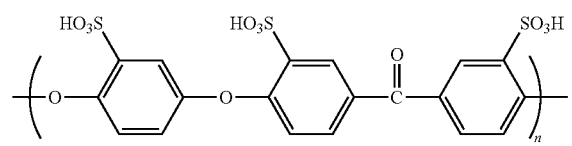
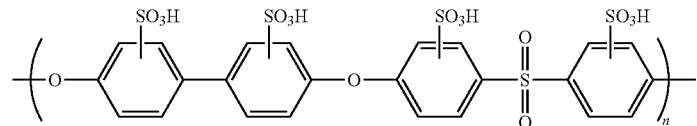
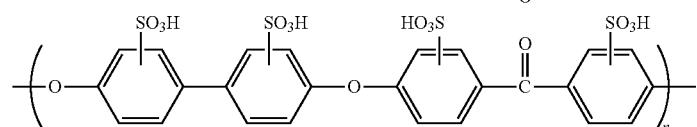
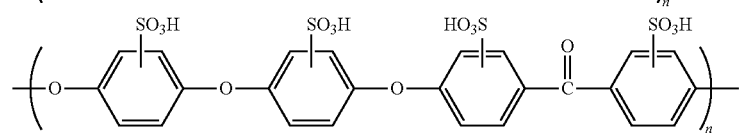

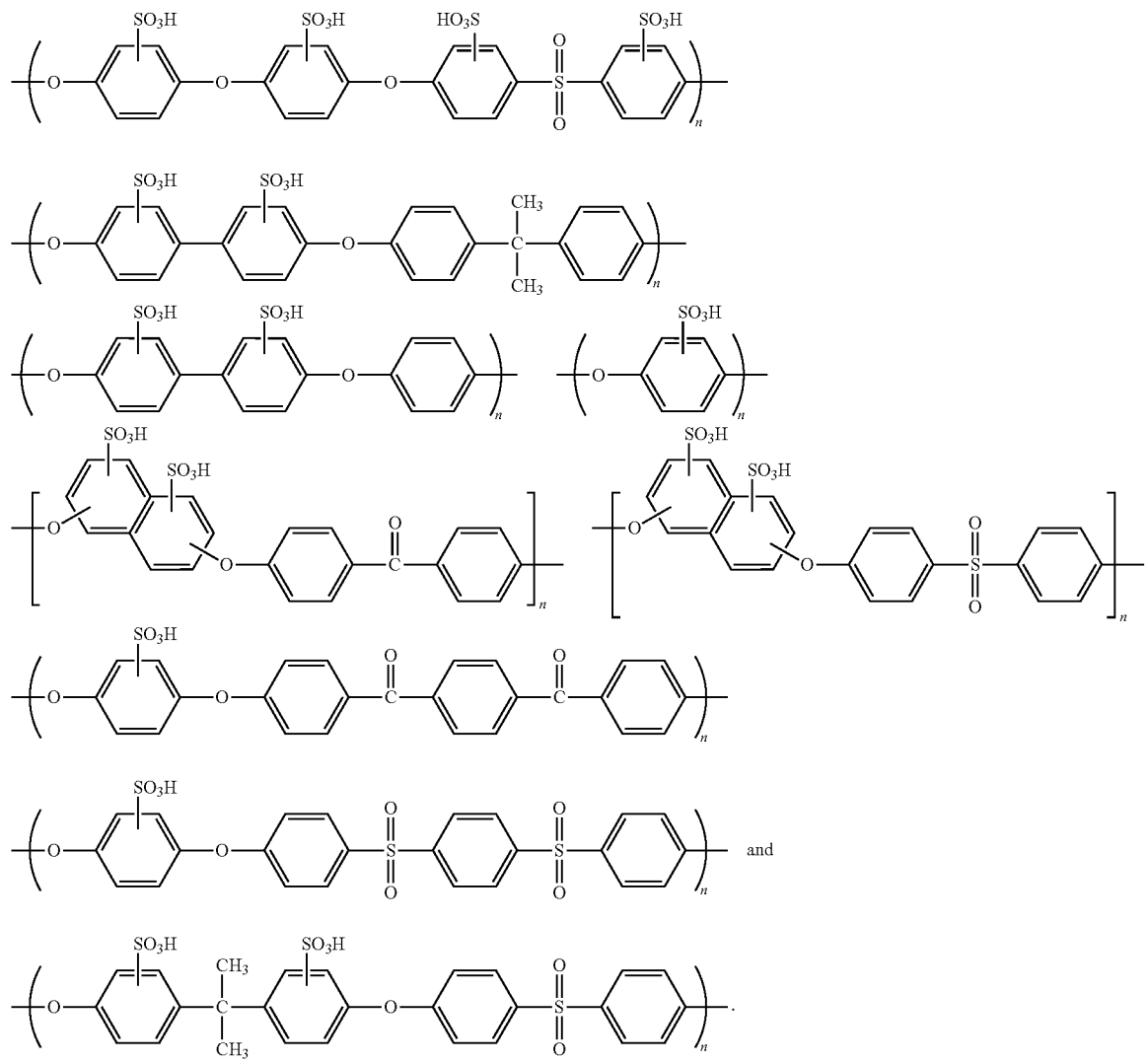

wherein n is an integer. Typically, n is an integer from 1 to 200.

In another variation of the present embodiment, a polymer with side groups represented by moieties $E_1R_8$ and $E_1R_8(SO_2X)_d$ is prepared by polymerizing a trifluorovinyl monomer comprising a side group to form a perfluorocyclobutane polymer having side groups. The side groups may be a sulfonated side group or a reactive group that can be converted into a sulfonated group in a subsequent reaction.

The monomer comprising a side group may comprise a chemical structure represented by the following chemical formula:

wherein $E_1$ is an aromatic ring containing group, m is a positive integer greater than 1, and $R_8$ is the side group which comprises either a sulfonated group or a reactive group capable of undergoing addition, substitution, condensation, and/or coupling reactions with other organic molecules to form a chemical bond. In particular, $R_8$ may be a reactive group that allows attachment of a sulfonated group to the monomer or the corresponding polymer through a chemical reaction. The aromatic ring containing group $E_1$ and side group $R_8$ have been described above. In a refinement, m is 2, 3 or 4. A linear graft polymer may be produced when m is 2. A branched graft polymer may be produced when m is 3. A cross-linked graft polymer may be prepared when m is 4. Several specific examples of graft monomers are shown in the following chemical formulas:

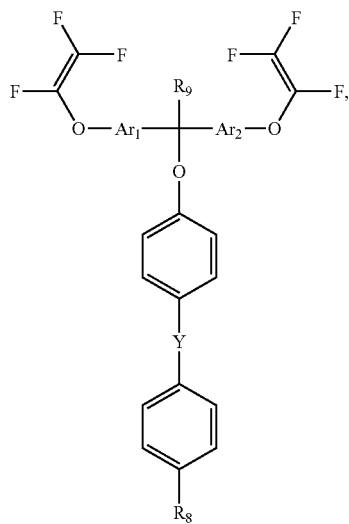

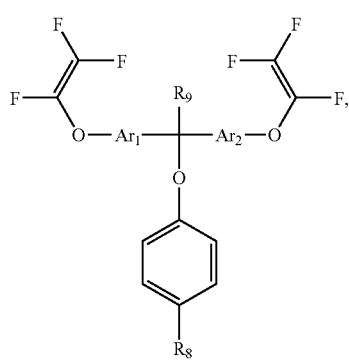

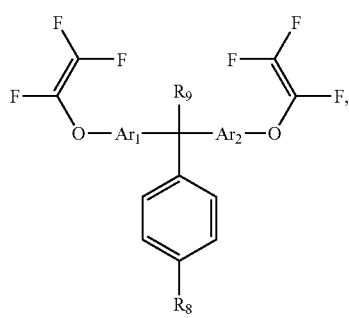

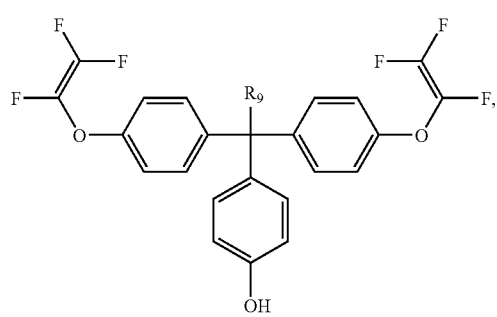

Figure 2:
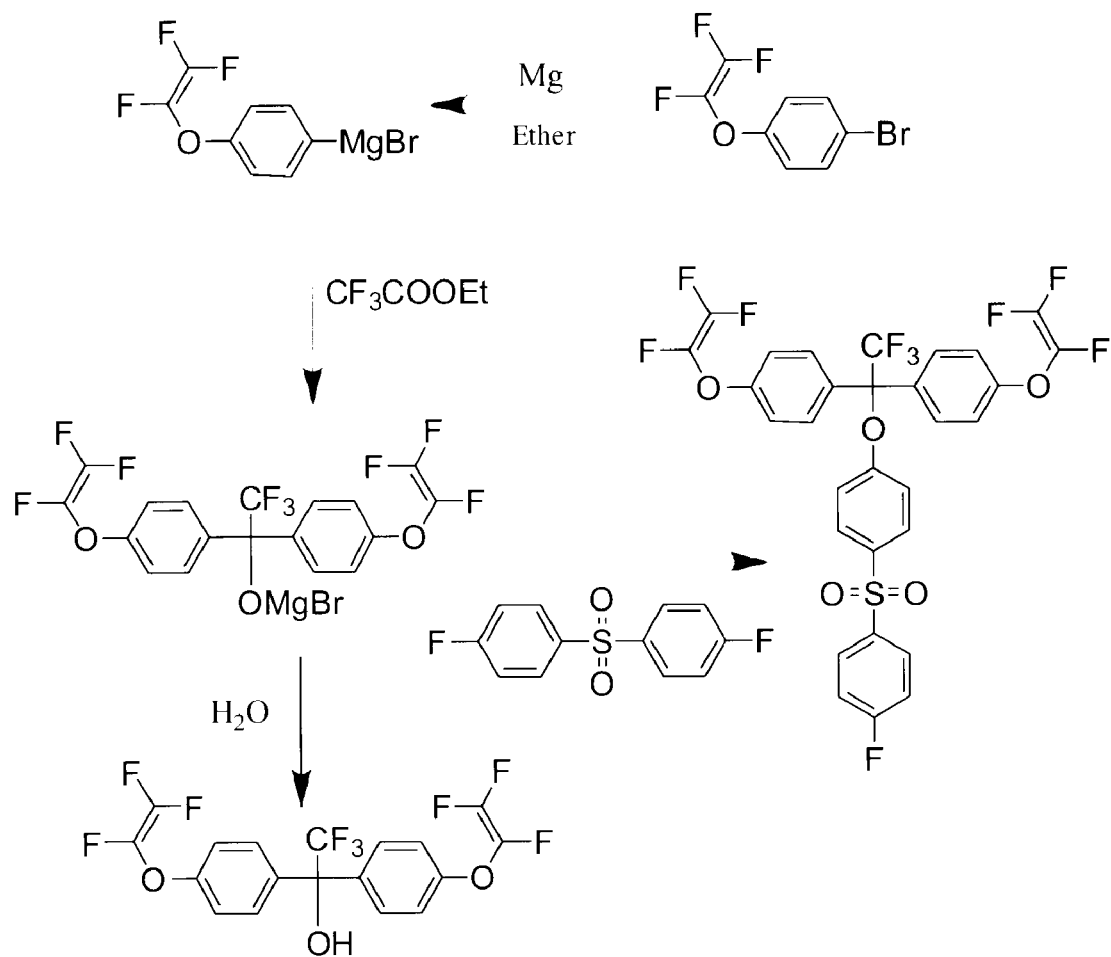
FIG. 2 provides examples of synthetic routes to monomers useful for preparing various polymers of the invention.
Figure 3:
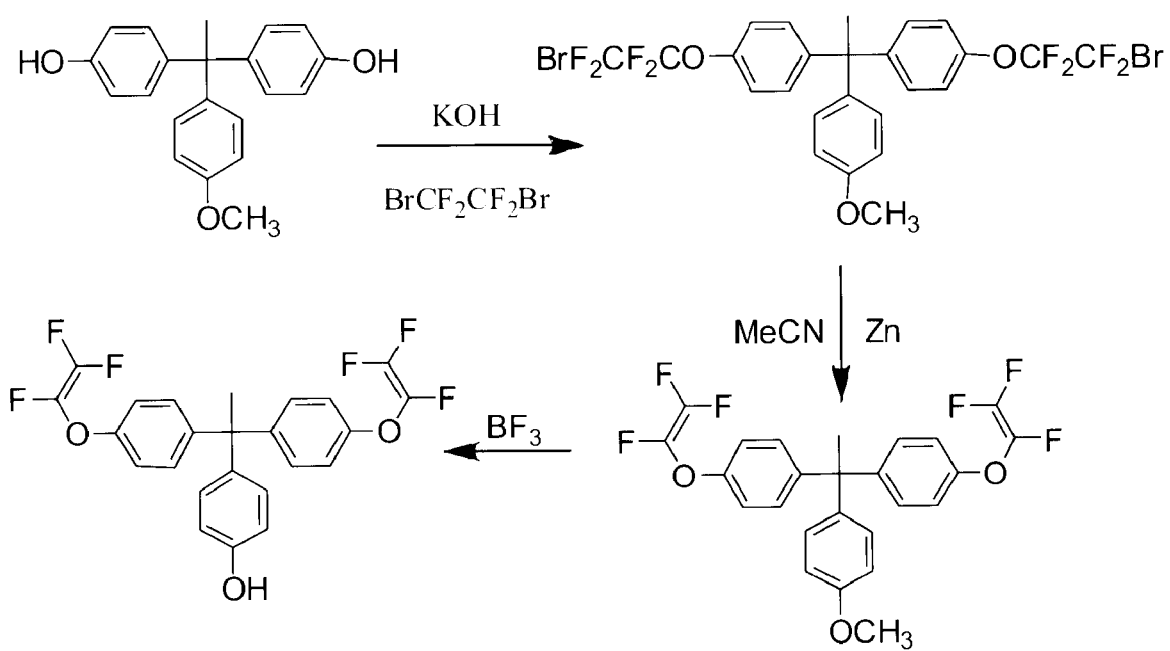
FIG. 3 provides another example of a synthetic route to a monomer useful for preparing various polymers of the invention.
Figure 4:
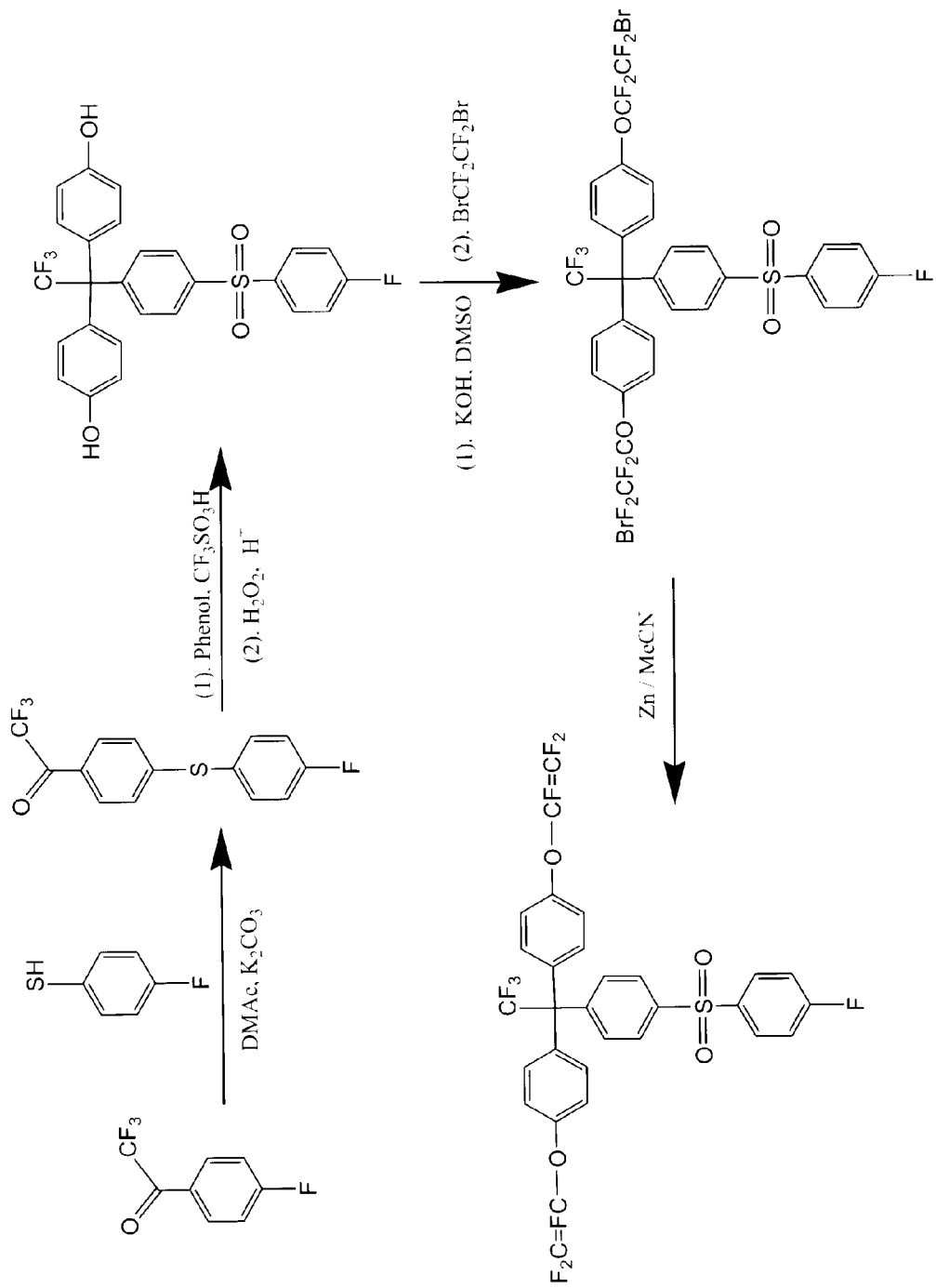
FIG. 4 provides another examples of synthetic routes to a monomer useful for preparing various polymers of the invention (see *Macromolecules*, 41 (6), 2126 (2008)

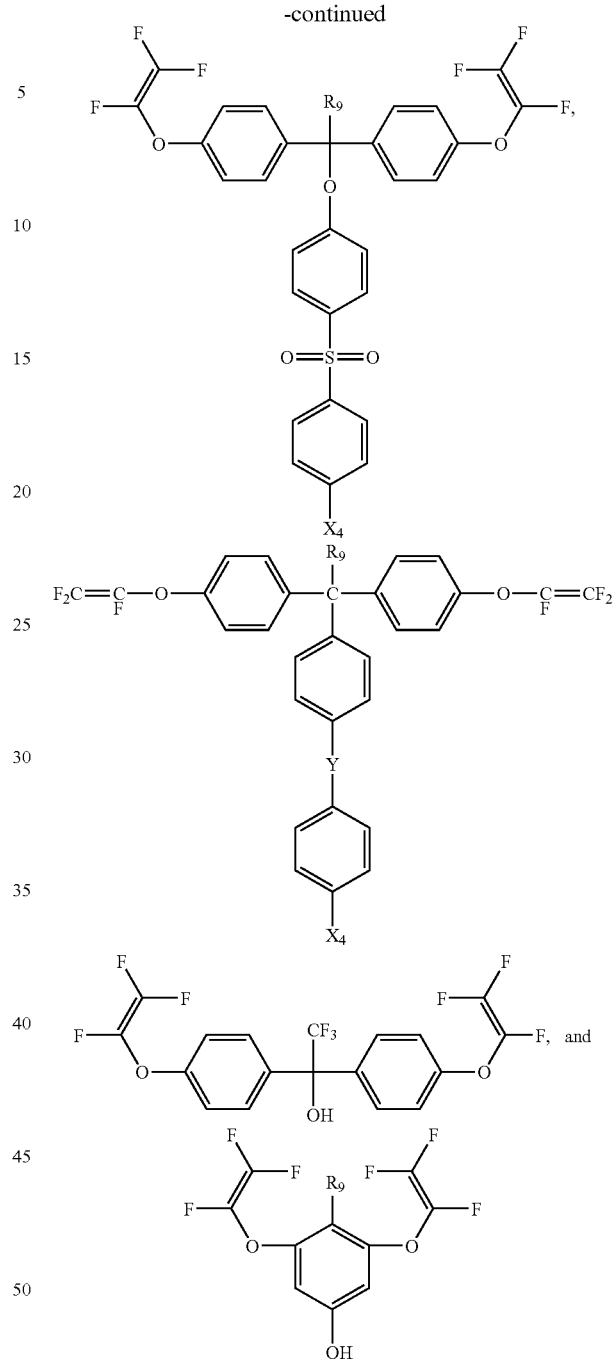

wherein Ar1 and Ar2 are aromatic ring containing groups, Y is a sulfone, amide or carbonyl group, R$_9$ is an acyl or haloacyl group and X$_4$ is a halogen atom. The reaction schemes of FIGS. 2, 3, and 4 provide examples of synthetic routes to several of the above monomers. With respect to the synthetic scheme of FIG. 4, 2,2,2,4'-tetrafluoroacetophenone first reacts with 4-fluorothiophenol in dimethylacetamide (DMAc) in the presence of potassium carbonate (K$_2$CO$_3$). The reaction product further reacts with phenol in the presence of triflic acid (CF$_3$SO$_3$H), followed by oxidation with hydrogen peroxide in acidic condition. A bisphenol with a pendant fluorophenylsulfone group is thus obtained. The bisphenol intermediate product further reacts with potassium hydroxide in dimethylsulfoxide (DMSO) solvent, followed by a reaction with 1,2-dibromo-tetrafluoroethane (BrCF$_2$CF$_2$Br) in a substitution reaction and a subsequent elimination reaction in the presence of zinc in acetonitrile (MeCN) to yield a bis(trifluorovinyloxylphenyl) monomer with a fluorophenylsulfone linking group.

The trifluorovinyl monomer with a linking group can either polymerize to form a homopolymer or copolymerize with other monomers to form copolymers, branched polymers or crosslinked polymers. There are no limitations on the type of other monomers that can be used to form copolymers. Many trifluorovinyl ether monomers, for example, can be copolymerized with the trifluorovinyl monomer with a linking group to form various random copolymers, block copolymers and crosslinked polymers. Bis(trifluorovinyl) ether monomers, such as 4,4'-bis(4-trifluorovinyloxy)biphenyl, 9,9-bis(4-trifluorovinyloxyphenyl)fluorene and 2,2'-bis(4-trifluorovinyloxyphenyl) 1,1,1,3,3,3-hexafluoropropane (available from Oakwood Products, Inc., West Columbia, S.C.), can copolymerize with the trifluorovinyl ether monomer with a linking group to form linear copolymers. Tris(trifluorovinyl ether) monomers such as 1,1,1-tris(4-trifluorovinyloxyphenyl) ethane can copolymerize with the trifluorovinyl ether monomer with a linking group to form branched and crosslinked main chain polymers.

Figure 5:
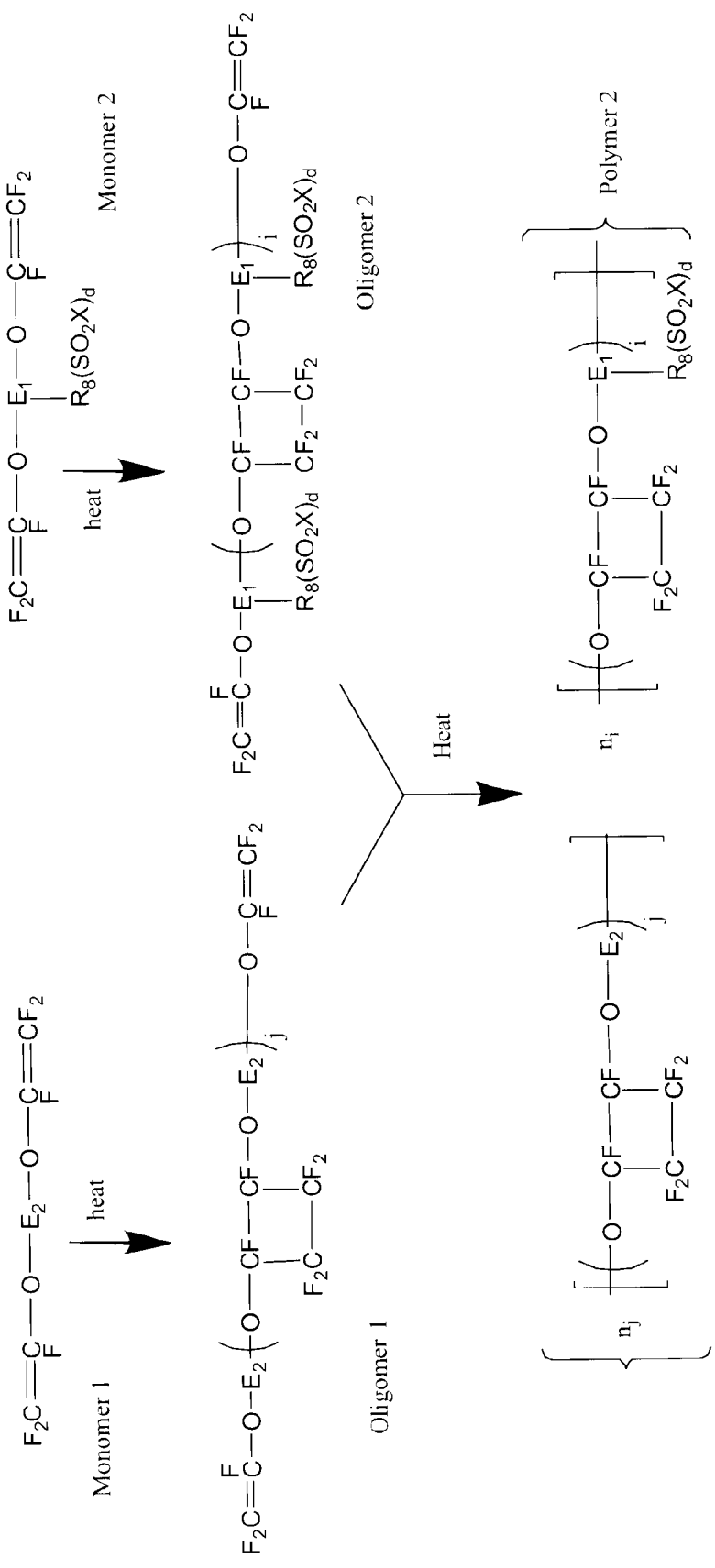
FIG. 5 provides a synthetic route of preparing a sulfonated perfluorocyclobutane block copolymer.

FIG. 5 describes a synthetic route of preparing a perfluorocyclobutane block copolymer. In this embodiment, a bis(trifluorovinyl) ether monomer having a moiety E$_2$ (monomer 1) and a bis(trifluorovinyl) ether monomer having a moiety E$_1$(R$_8$SO2X)$_d$ (monomer 2) are reacted separately through a thermal cycloaddition coupling reaction to form two oligomers (oligomer 1 and oligomer 2). Each of the oligomers has two trifluorovinyl ether end groups, and is thus a difunctional oligomer. Moiety E$_2$ and the components of moiety E$_1$(R$_8$SO$_2$X)$_d$ are set forth above. In general, oligomers 1 and 2 are formed with a distribution of molecular weights describable as a range for the values i and j. The ranges for i and j are set forth above. The two difunctional oligomers are combined and reacted together through thermal coupling reaction between their end groups to form a block copolymer (polymer 2). This latter step can be performed either in the polymer melt or in solution. Polymer 2 in turn is composed of a distribution of polymer units having a range of values for i and j. The counting indices n$_i$ and n$_j$ provide the number of units of size i and j present in polymer 1. The assembly of these polymer units allows for the formation of block copolymers, multiblock polymers, and random copolymers. For example, if i and j are 100 and n$_i$ and n$_j$ are 1, we have a diblock. If i and j are 100 and n$_i$ is 2 and n$_j$ is 1, a triblock may be constructed with a block containing E$_2$ in the middle. The values of n$_i$ and n$_j$ are such that the average molecular weight of polymer 2 is less than 400 kdaltons. In another refinement, the values of n$_i$ and n$_j$ are such that the average molecular weight of polymer 1 is less than 300 kdaltons. In yet another refinement, the values of n$_i$ and n$_j$ are such that the average molecular weight of polymer 2 is less than 200 kdaltons. Formation of random copolymers may be avoided by first preparing oligomers from one or both monomers separately before combining with the other corresponding monomer or oligomer to form the block copolymer. Thermal coupling reactions, also called cycloaddition reaction, of trifluorovinyl ethers for preparing oligomers and polymers are described in U.S. Pat. No. 6,384,167 B2 and U.S. Pat. No. 6,559,237 B1. The entire disclosures of these patents are hereby incorporated by reference.

Figure 6:
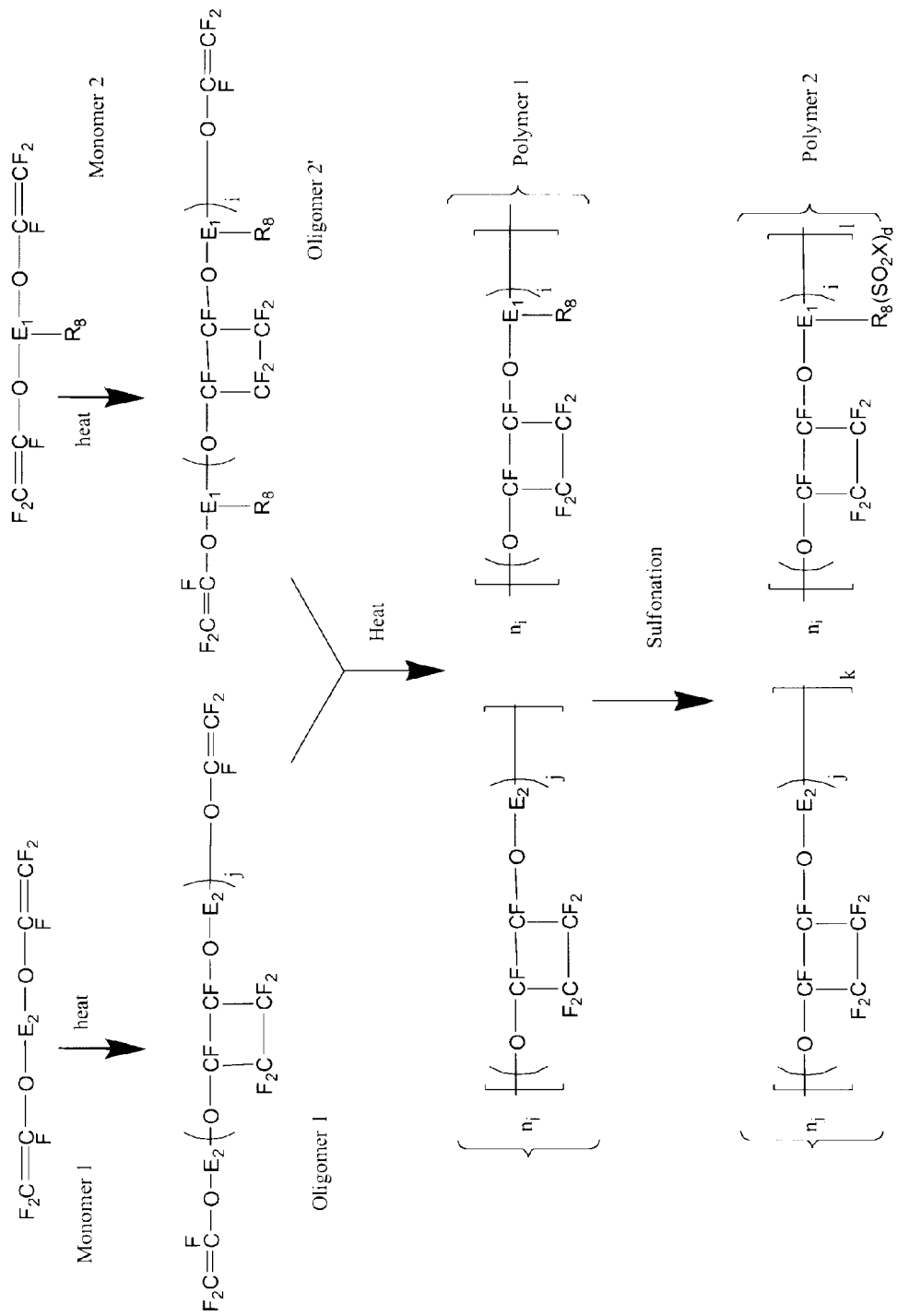
FIG. 6 provides another synthetic route of preparing a sulfonated perfluorocyclobutane block copolymer.

FIG. 6 describes a synthetic route of preparing a perfluorocyclobutane block copolymer. In this embodiment, a bis(trifluorovinyl)ether monomer having a moiety E$_2$ (monomer 1) and a bis(trifluorovinyl)ether monomer having a moiety E$_1$R$_8$ (monomer 2') are reacted separately through a thermal cycloaddition coupling reaction to form two oligomers (oligomer 1 and oligomer 2'). Each of the oligomers has two trifluorovinyl ether end groups, and is thus a difunctional oligomer. Moiety E$_2$ and the components of moiety E$_1$R$_8$ are set forth above. In general, oligomers 1 and 2' are formed with a distribution of molecular weights describable as a range for the values i and j. The ranges for i and j are set forth above. The two difunctional oligomers are combined and reacted together through thermal coupling reaction between their end groups to form a block copolymer (polymer 1). Polymer 1 is further reacted with a sulfonation agent such as X$_2$SO$_3$H (X$_2$ is chlorine or fluorine atom) to selectively sulfonate moiety E$_1$R$_8$, resulting in a perfluorocyclobutane block copolymer (polymer 2) having a hydrophobic chain segment and a hydrophilic sulfonated chain segment.

Figure 7:
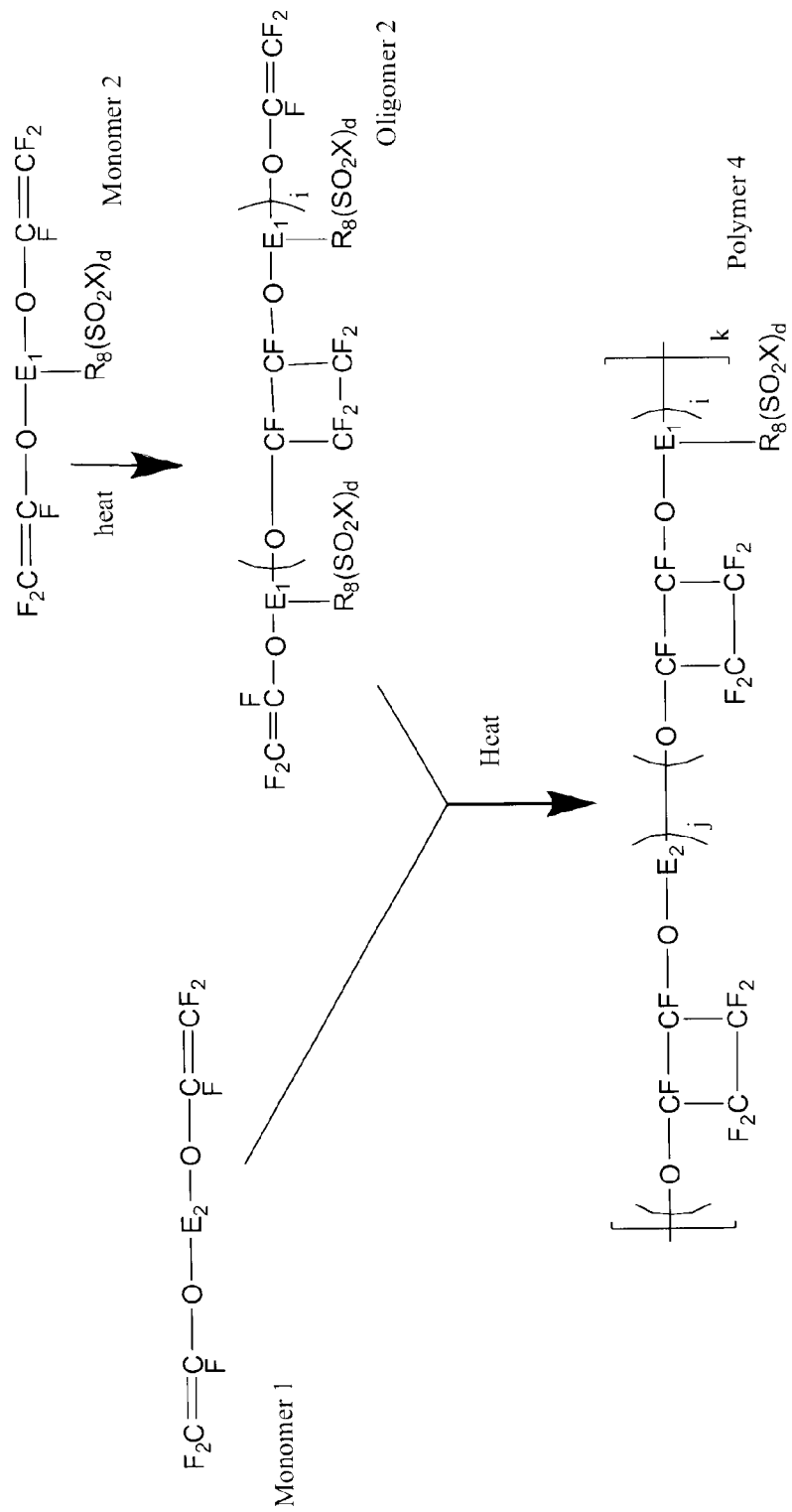
FIG. 7 provides another synthetic route of preparing a sulfonated perfluorocyclobutane block copolymer.

In another embodiment as shown in FIG. 7, oligomer 2 is formed from monomer 2 as set forth above. Monomer 1 is then reacted with oligomer 2 to form polymer 4. In this figure, i, j, and k are positive integers. Typically, i, j, and k are each independently from about 1 to about 200. In another refinement of this variation, i, j, and k are each independently from 1 to 60. In still another refinement of this variation, i, j, and k are each independently from 1 to 35. In yet another refinement of this variation, i, j, and k are each independently from 5 to 60. In yet another refinement of this variation, i, j and k are each independently from 5 to 35.

Figure 8:
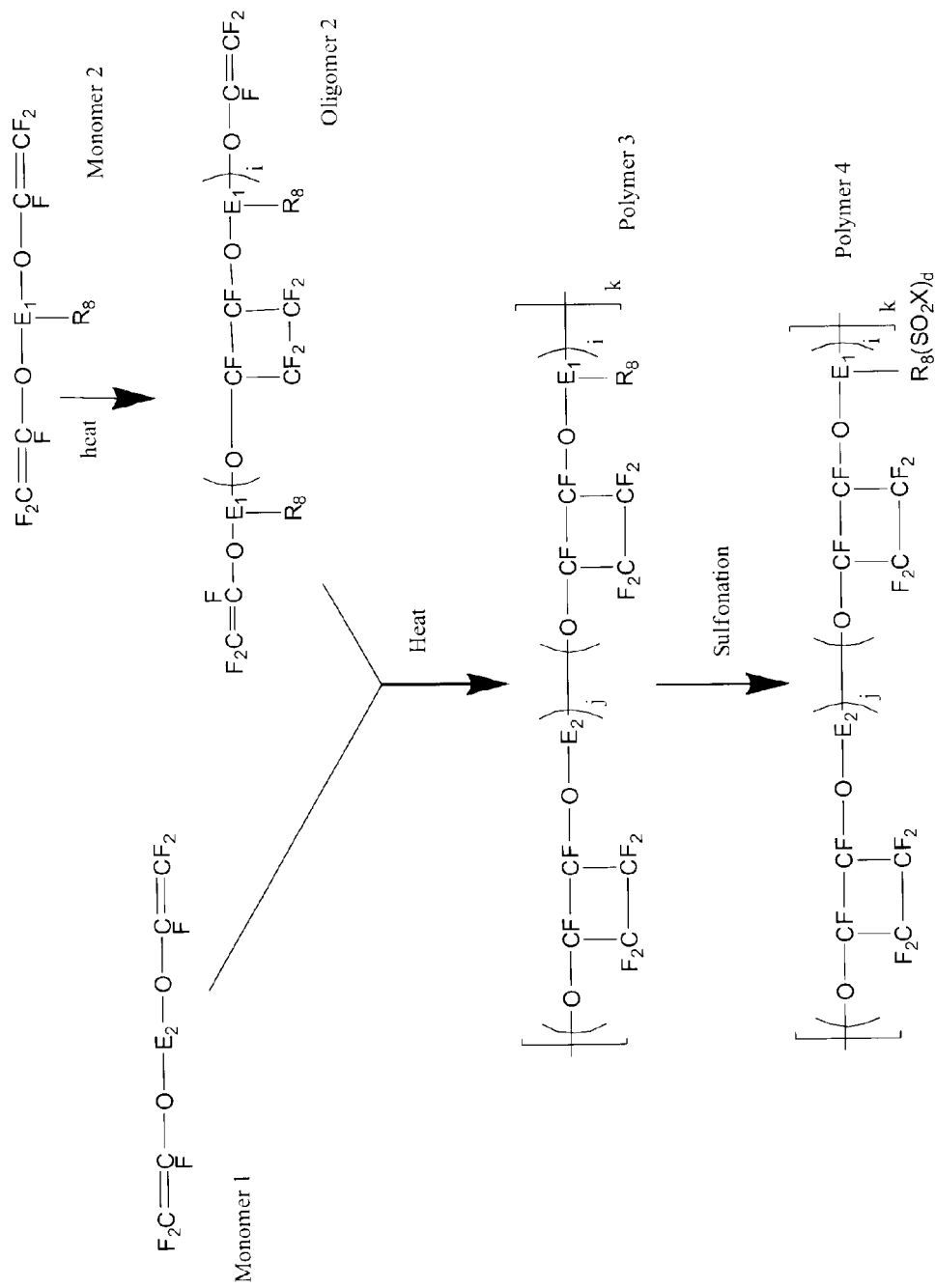
FIG. 8 provides another synthetic route of preparing a sulfonated perfluorocyclobutane block copolymer.

In another embodiment as shown in FIG. 8, oligomer 2 is formed from monomer 2 as set forth above. Monomer 1 is then reacted with oligomer 2 to form polymer 3. Polymer 3 is further reacted with a sulfonation agent X$_2$SO$_3$H (X$_2$ is chlorine or fluorine atom) to selectively sulfonate moiety E$_1$R$_8$, resulting in a perfluorocyclobutane block copolymer (polymer 4) having a hydrophobic chain segment and a hydrophilic sulfonated chain segment. In this figure, i, j, and k are positive integers. Typically, i, j, and k are each independently from about 1 to about 200. In another refinement of this variation, i, j, and k are each independently from 1 to 60. In still another refinement of this variation, i, j, and k are each independently from 1 to 35. In yet another refinement of this variation, i, j, and k are each independently from 5 to 60. In yet another refinement of this variation, i, j and k are each independently from 5 to 35.

Figure 9:
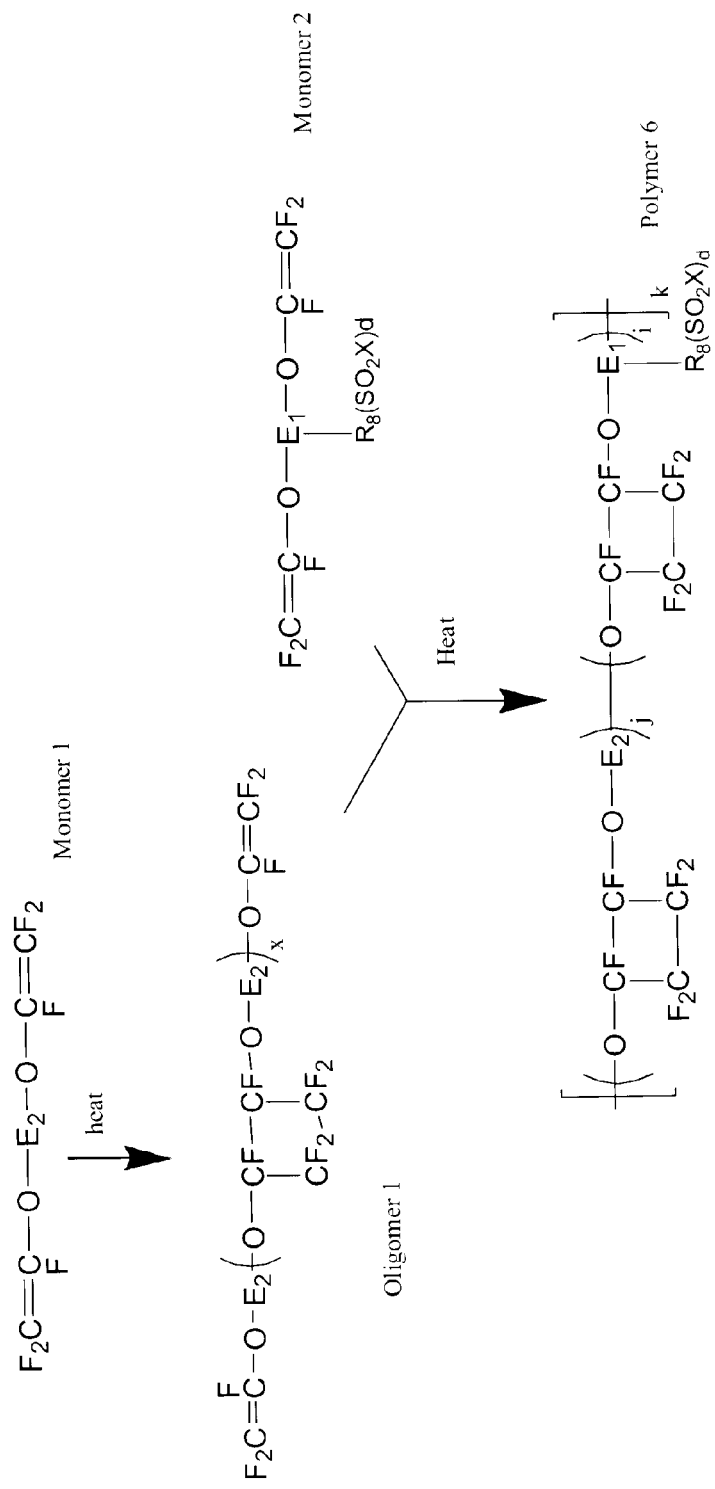
FIG. 9 provides another synthetic route of preparing a sulfonated perfluorocyclobutane block copolymer.

In yet another embodiment, as shown in FIG. 9, oligomer 1 is formed from monomer 1 as set forth above. Monomer 2 is then reacted with oligomer 1 to form polymer 6. In this figure E$_1$, E$_2$, are as above and i, j, and k are positive integers. Typically, i, j, and k are each independently from about 1 to about 400. In another refinement of this variation, i, j, and k are each independently from 1 to 60. In still another refinement of this variation, i, j, and k are each independently from 1 to 35. In yet another refinement of this variation, i, j, and k are each independently from 5 to 60. In yet another refinement of this variation, i, j and k are each independently from 5 to 35.

Figure 10:
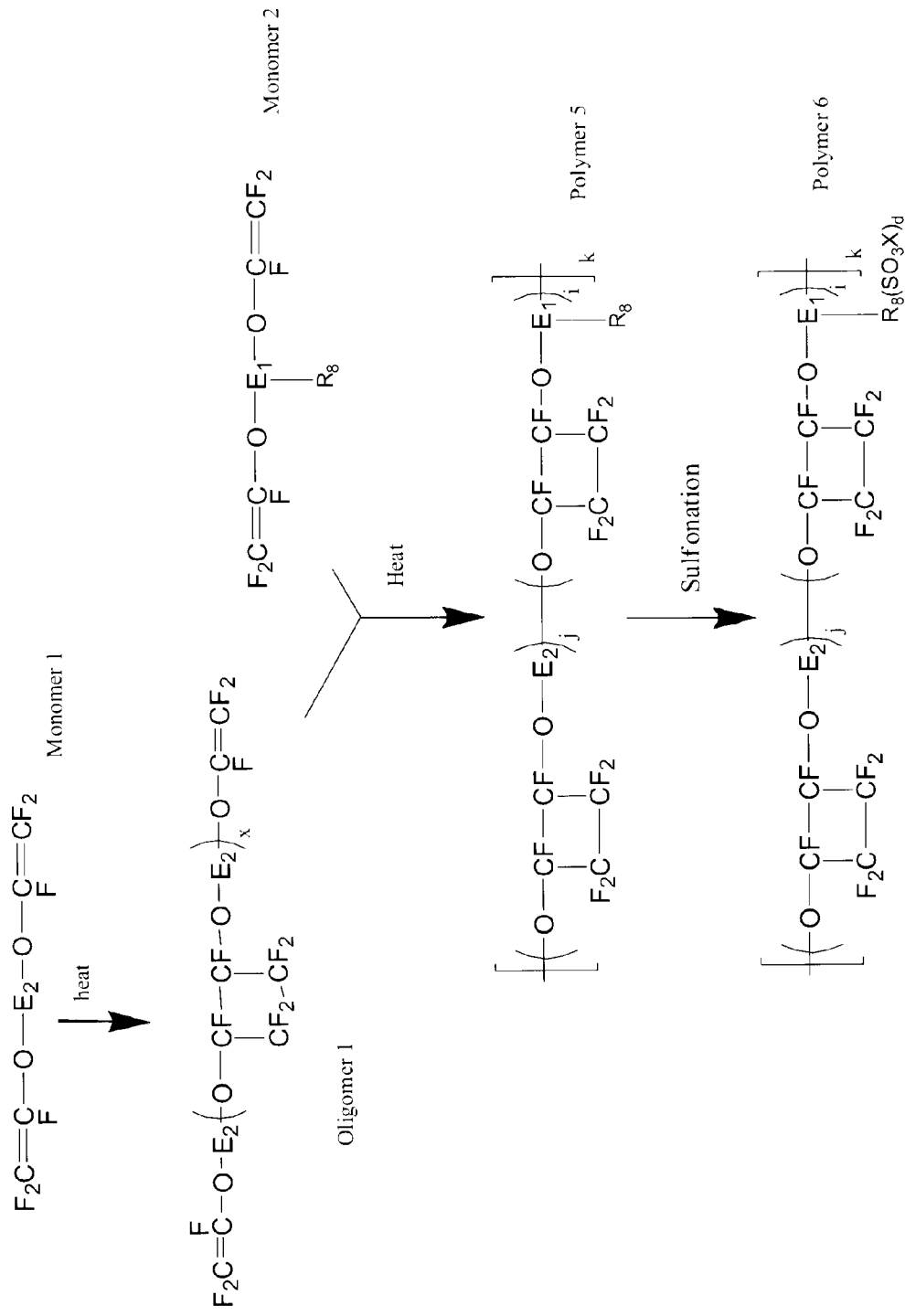
FIG. 10 provides another synthetic route of preparing a sulfonated perfluorocyclobutane block copolymer.

In yet another embodiment, as shown in FIG. 10, oligomer 1 is formed from monomer 1 as set forth above. Monomer 2 is then reacted with oligomer 1 to form polymer 5. Polymer 5 is further reacted with a sulfonation agent X$_2$SO$_3$H (X$_2$ is chlorine or fluorine atom) to selectively sulfonate moiety E$_1$R$_8$, resulting in a perfluorocyclobutane block copolymer (polymer 6) having a hydrophobic chain segment and a hydrophilic sulfonated chain segment. In this figure E$_1$, E$_2$, are as above and x is a positive integer. Typically, x is from about 1 to about 200. In another refinement of this variation, x is from 1 to 60. In still another refinement of this variation, x is from 1 to 35. In yet another refinement of this variation, x is from 5 to 60. In yet another refinement of this variation, i, j and k are from 5 to 35, respectively.

Figure 11:
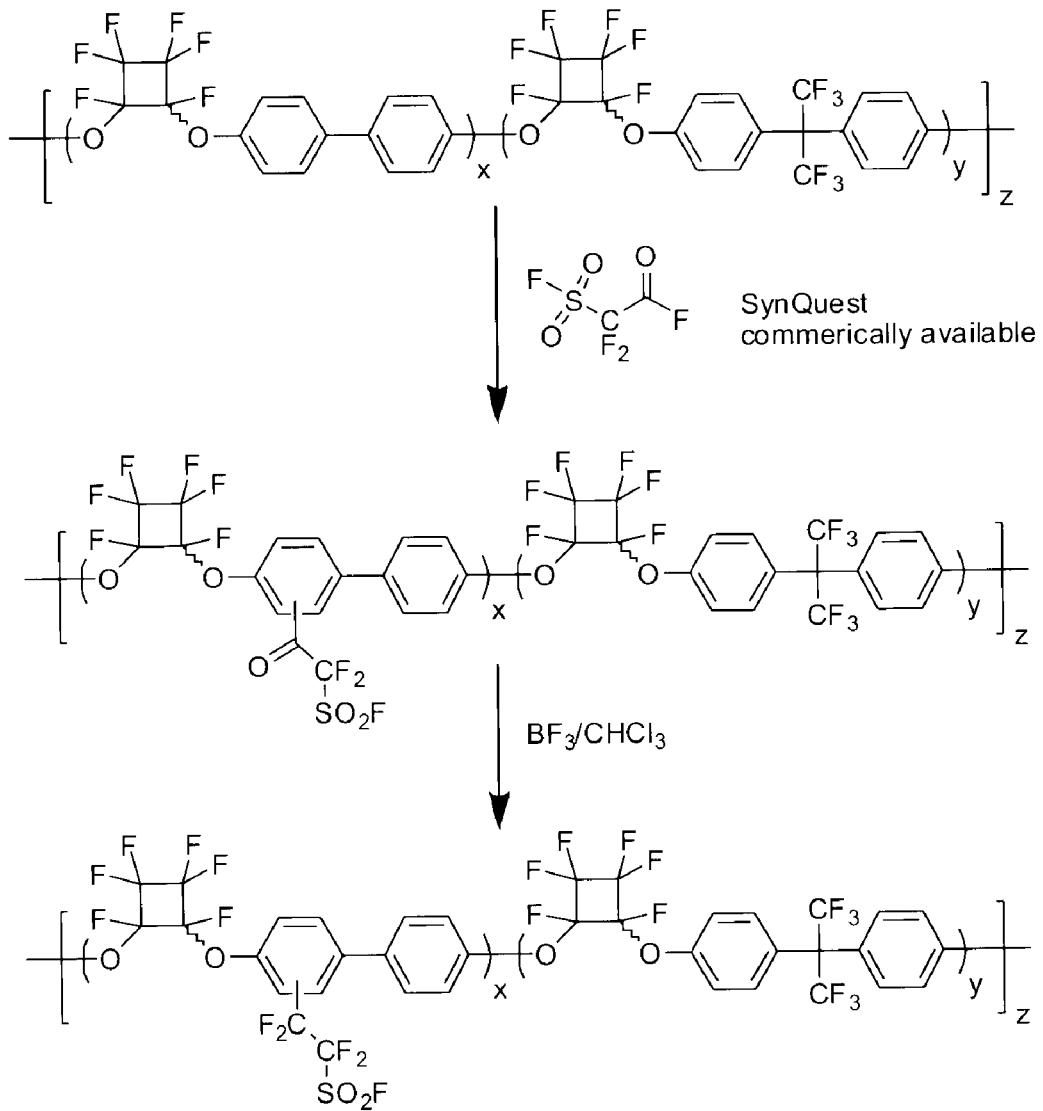
FIG. 11 provides a reaction scheme for sulfonating a block copolymer.

In another variation of the present embodiment, the pendant $R_8$ or $R_8(SO_2X)_d$ group may be attached to $E_1$ through a Friedel-Crafts or a lithiation reaction. In a Friedel-Crafts reaction, one of the reactants may be a carboxylic acid, carboxylic anhydride, carboxylic acid halide, alkyl halide or derivatized alkene. A Lewis acid catalyst, such as $AlCl_3$ and hydrogen fluoride, may be used to facilitate the reaction. Examples of reactants for adding the pendant group having a sulfonate group include 2-(fluorosulfonyl)difluoroacetic acid and 2-(fluorosulfonyl)difluoroacetyl fluoride, both of which are available from SynQuest Laboratories (Alachua, Fla.). Sulfonation through a spacer molecule may be used to sulfonate different pre-polymers, polymers and block copolymers having sulfonatable polymer segments with or without linking groups between different polymer segments. The reaction scheme provided by FIG. 11 demonstrates, as an example, the sulfonation of a block copolymer through 2-(fluorosulfonyl)difluoroacetyl fluoride as the pendant group precursor. In that sulfonation reaction, a fluorosulfonic group is linked to a sulfonatable biphenyl group via a tetrafluoroethylene group. This perfluoroalkyl sulfonic side group can be converted into a proton conducting sulfonic acid group which has excellent thermal and chemical stability. In this figure, x, y, z are positive integers. Typically x, y, z are each independently from about 1 to about 200. In another refinement of this variation, x, y, z are each independently from 1 to 60. In still another refinement of this variation, x, y, z are each independently from 1 to 35. In yet another refinement of this variation, x, y, z are each independently from 5 to 60. In yet another refinement of this variation, x, y, z are each independently from 5 to 35.

Figure 12:
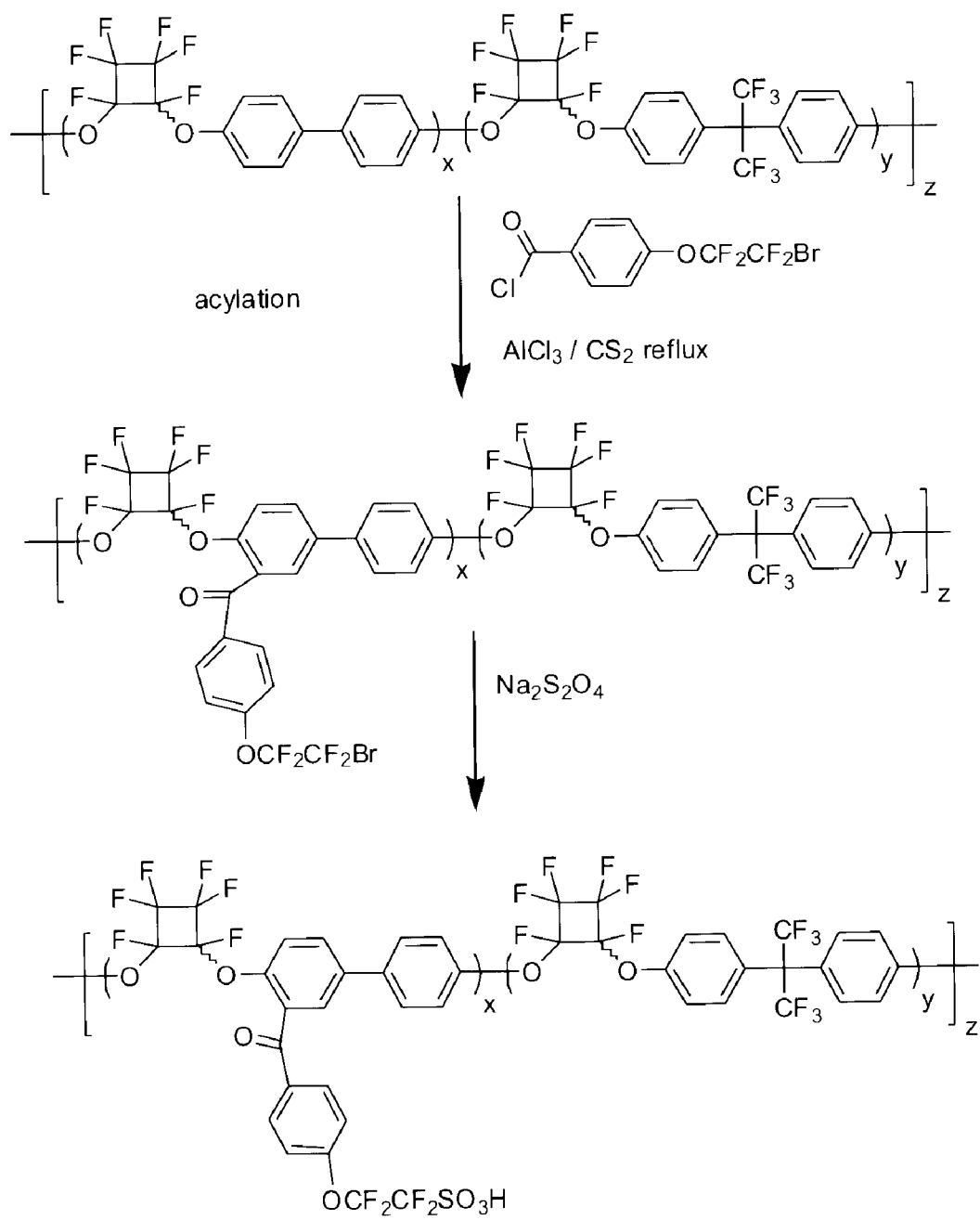
FIG. 12 provides a synthetic route for preparing a polymer with a pendant side group.
Figure 13:
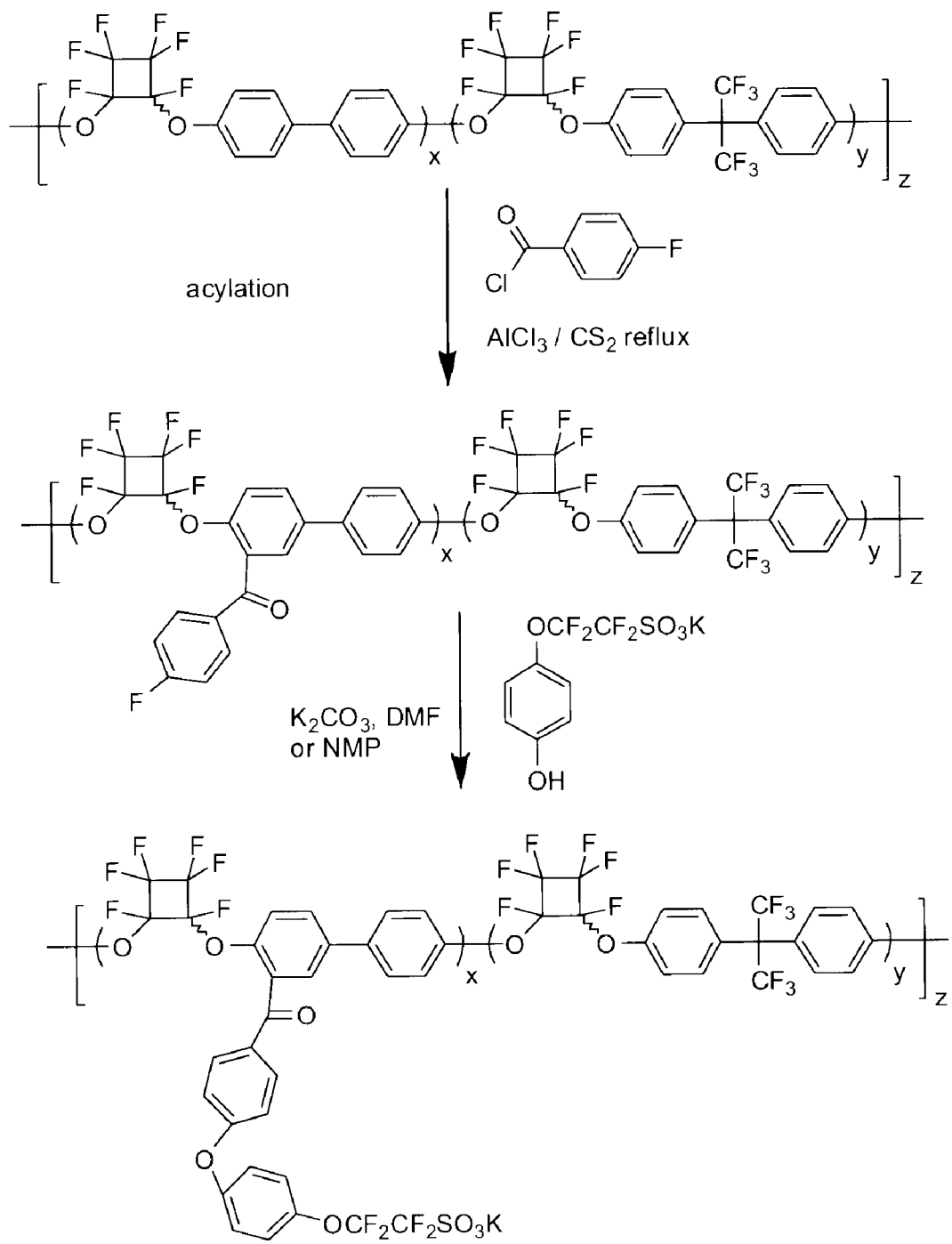
FIG. 13 provides another synthetic route for preparing a polymer with a pendant side group.
Figure 14:
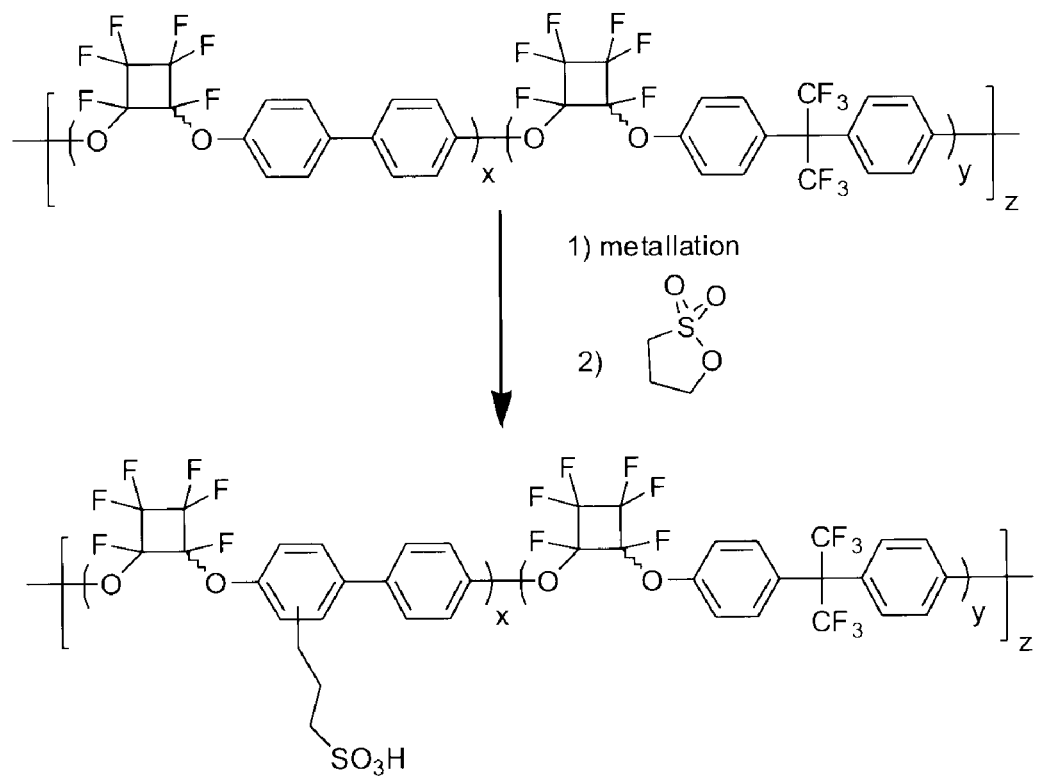
FIG. 14 provides another synthetic route for preparing a polymer with a pendant side group.

In reaction schemes of FIGS. 12 and 13, pendant group precursors, 4-(1-bromotetrafluoroethyloxy)benzoyl chloride and 4-fluorobenzoyl chloride are used to attach the pendant group on a sulfonatable biphenyl group in a block copolymer, followed by substitution to include a sulfonate group. Alternatively, in the reaction scheme of FIG. 14, the sulfonatable biphenyl group in a polymer segment is first reacted with lithium metal, followed by reaction with a spacer molecule, 1,3-propanesultone (a cyclic sulfonic ester, available from Aldrich), to form a sulfopropyl substitution on the biphenyl group. Perhaps an even better approach with precedent is the use of anhydrous aluminum chloride ($AlCl_3$) instead of lithiation. The attachment of alkyl sulfonic acid groups to aromatic, non-PFCB polymers is described in US Patents 2003/0096149A1 (May 22, 2003) and U.S. Pat. No. 6,670,065 (Dec. 30, 2003). In these figures x, y, z are positive integers. Typically x, y, z are each independently from about 1 to about 200. In another refinement of this variation, x, y, z are each independently from 1 to 60. In still another refinement of this variation, x, y, z are each independently from 1 to 35. In yet another refinement of this variation, x, y, z are each independently from 5 to 60. In yet another refinement of this variation, x, y, z are each independently from 5 to 35.

Figure 15:
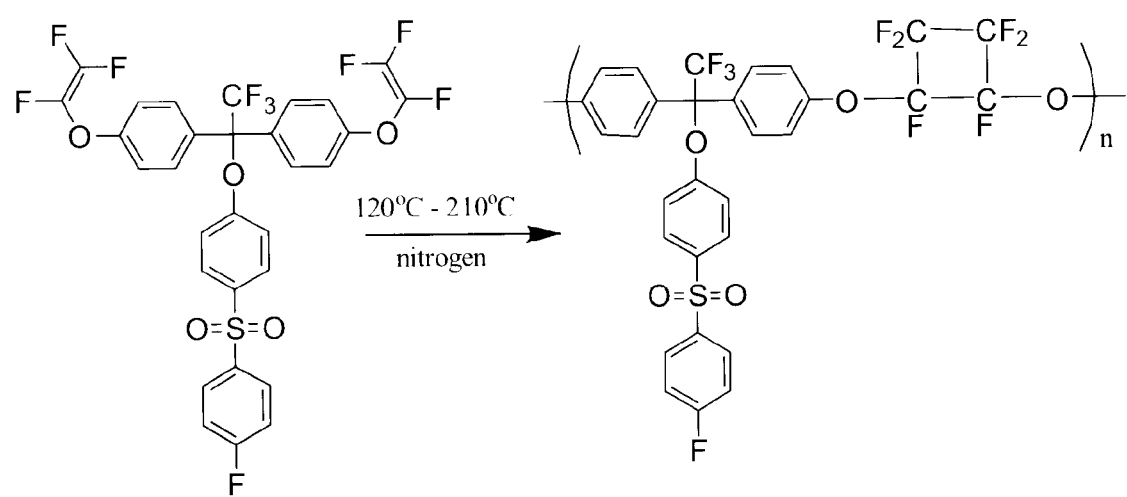
FIG. 15 provides another synthetic route for preparing a polymer with a pendant side group.
Figure 16:
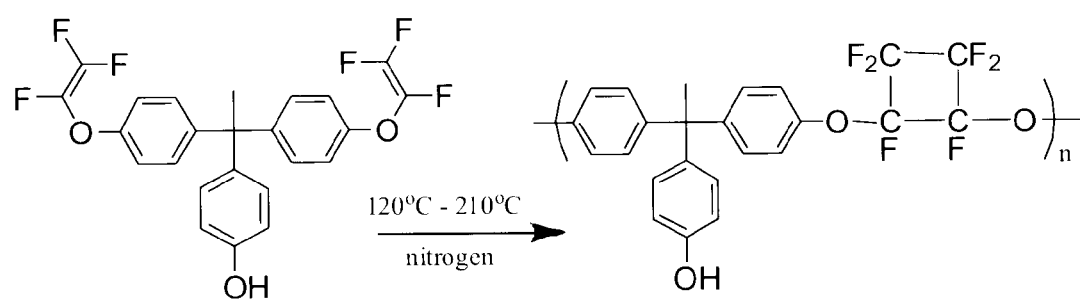
FIG. 16 provides another synthetic route for preparing a polymer with a pendant side group.
Figure 17:
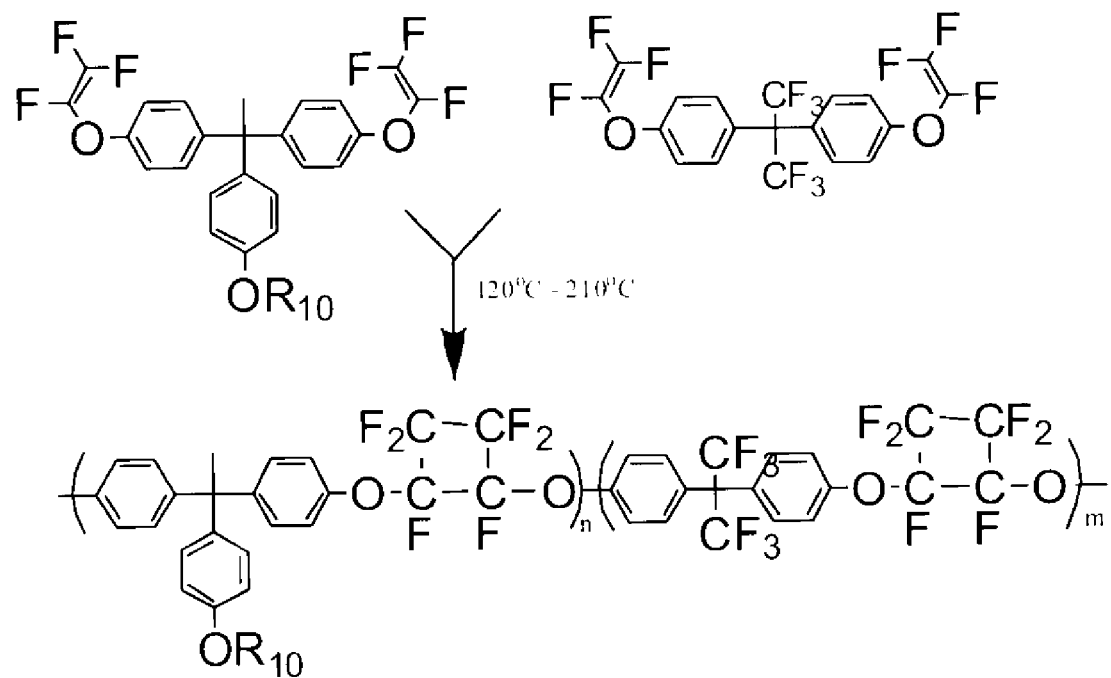
FIG. 17 provides another synthetic route for preparing a polymer with a pendant side group ($R_{10}$=alkyl, or H)

The monomer with a pendant side group may be polymerized through thermal addition reaction of the trifluorovinyl groups. The thermal addition reaction may be carried at a temperature between about 120° C. to about 210° C. in inert atmosphere such as nitrogen and argon. One or more of the monomers may be polymerized to form a homopolymer or a copolymer. Additionally, the monomer may be copolymerized with any other trifluorovinyl monomers. Examples of such other trifluorovinyl monomers include 2,2'-bis(4-trifluorovinyloxyphenyl) 1,1,1,3,3,3-hexafluoropropane, 4,4'-bis(4-trifluorovinyloxy)biphenyl, 9,9-bis(4-trifluorovinyloxyphenyl)fluorene, and 1,1,1-tris[(4-trifluorovinyloxy)phenyl]ethane. The reaction schemes of FIGS. 15, 16, and 17 illustrate the synthesis of several graft polymers using several graft monomers described above. In these figures n, m, x, y, z are positive integers. Typically, n, m, x, y, z are each independently from about 1 to about 200. In another refinement of this variation, n, m, x, y, z are each independently from 1 to 60. In still another refinement of this variation, n, m, x, y, z are each independently from 1 to 35. In yet another refinement of this variation, n, m, x, y, z are each independently from 5 to 60. In yet another refinement of this variation, n, m, x, y, z are each independently from 5 to 35.

Figure 18:
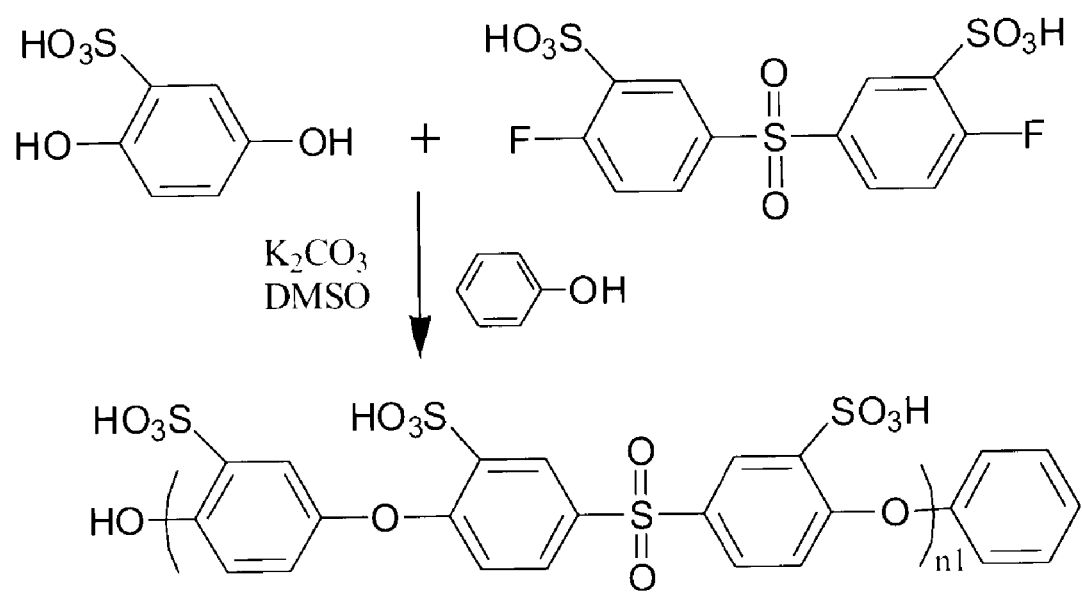
FIG. 18 provides a synthetic route for preparing a sulfonated side group.
Figure 19:
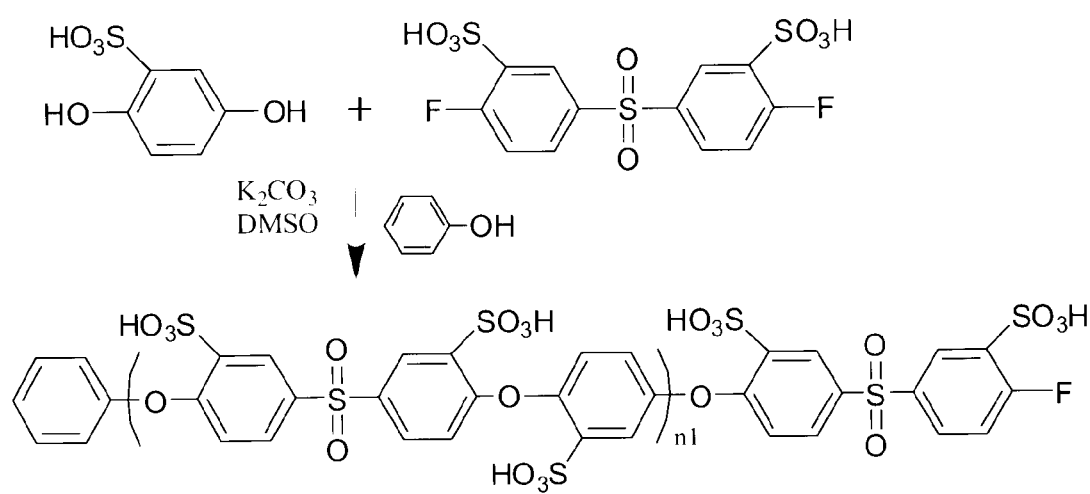
FIG. 19 provides another synthetic route for preparing a sulfonated side group.
Figure 20:
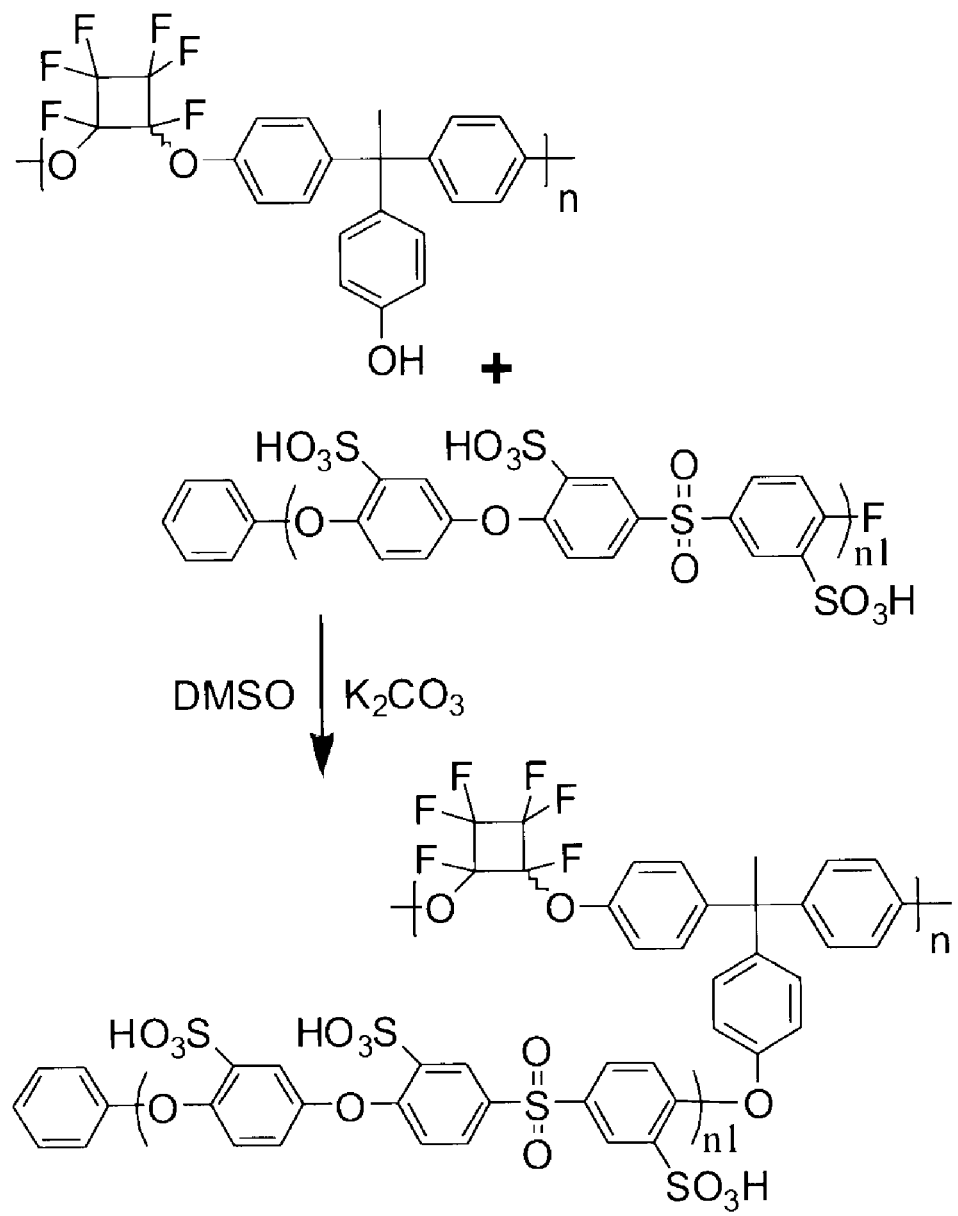
FIG. 20 provides a synthetic route for attaching a sulfonated side group to a polymer (reaction with olefinic perfluorosulfonic acid monomers.
Figure 21:
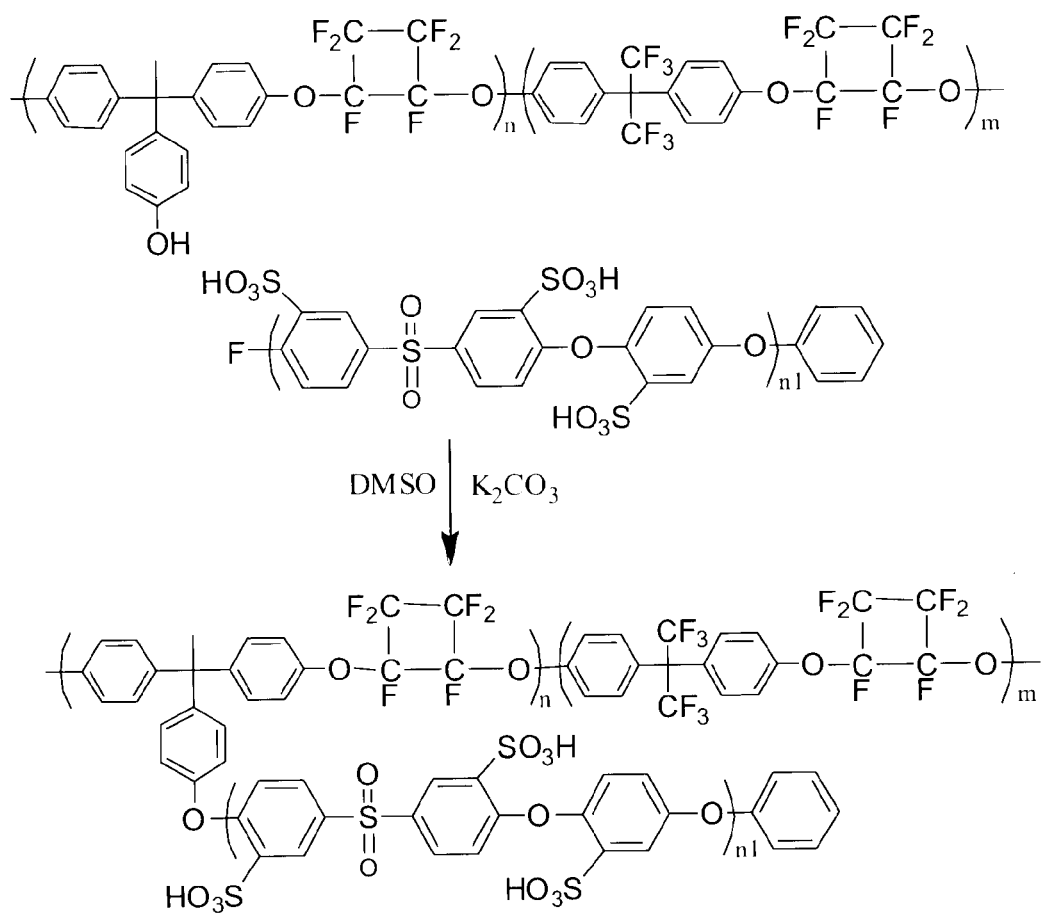
FIG. 21 provides another synthetic route for attaching a sulfonated side group to a polymer.
Figure 22:
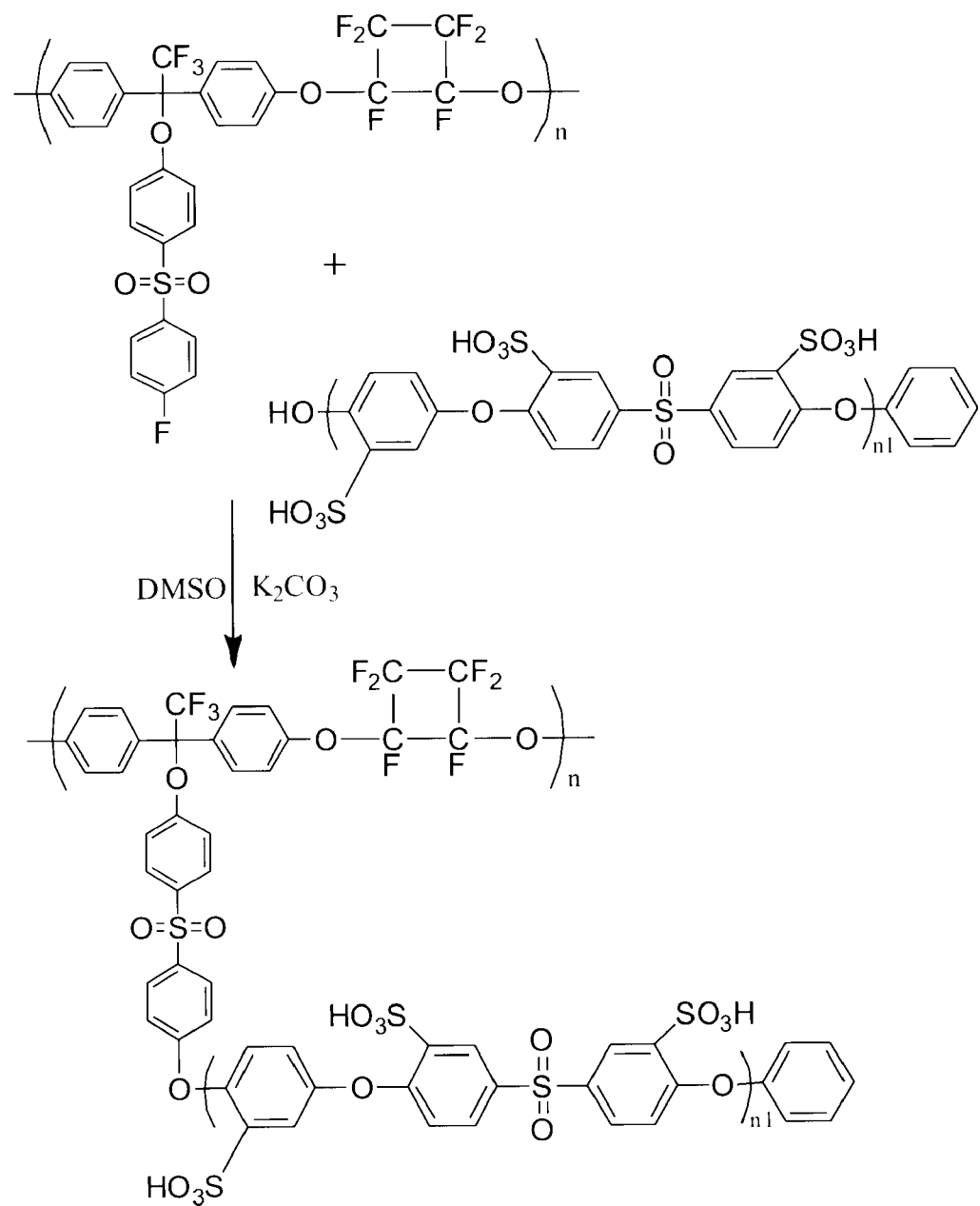
FIG. 22 provides a synthetic route for attaching a sulfonated side group to a polymer.

In a variation of the present invention, the reactive side groups of the polymers set forth above may be converted to sulfonated side groups through various chemical reactions. Addition, substitution, condensation, and/or coupling reactions may be used to attach a sulfonated or sulfonatable side group to the graft polymer. The sulfonated side group may include a sulfonated polymer chain. For an example, a reactive sulfonated molecule may be prepared by reacting sulfonated hydroquinone and 3,3-disulfonated-bis(fluorophenylsulfone). Sulfonated hydroquinone and 3,3-disulfonated-bis(fluorophenylsulfone) (at about 1:1 molar ratio) along with small amount of phenol are charged in a reaction vessel fitted with a Dean Stark trap, a mechanical stirrer, dimethylsulfoxide (DMSO) solvent and 1.1 equivalents of $K_2CO_3$ (based on the molar amount of sulfonated hydroquinone). Toluene is further added to the reaction mixture as an azeotropic solvent. The mixture is refluxed for sufficient amount of time under nitrogen blanket, and water is continuously removed with a Dean Stark trap. When sufficient degree of conversion is reached, the reaction mixture is cooled and diluted with dry DMSO. The molecular weight of the final product depends on the molar ratio of the three starting materials, namely, sulfonated hydroquinone, 3,3-disulfonated-bis(fluorophenylsulfone) and phenol. When the ratio of sulfonated hydroquinone to 3,3-disulfonated-bis(fluorophenylsulfone) and phenol is about 1, a sulfonated molecule with phenol reactive group is obtained as shown in reaction scheme of FIG. 18. When the ratio of sulfonated hydroquinone to 3,3-disulfonated-bis(fluorophenylsulfone) is 1 and phenol is about 1, a sulfonated molecule with fluorophenyl reactive group is obtained as shown in the reaction scheme of FIG. 19 where n1 is a positive integer and it is determined by selecting the ratio of sulfonated hydroquinone to phenol as illustrated in the above two examples. By controlling the ratio of the starting materials used, n1 may range from 1 to about 10,000, or preferably 1 to about 500. Thus, a reactive sulfonated small molecule or a polymeric sulfonated molecule is obtained for subsequent reaction with the reactive graft polymer side groups. Additional examples are provided herein in the reaction schemes of FIGS. 20, 21, and 22 using the reactive sulfonated molecules and polymer with reactive groups described above. In these figure n, m, n1 are positive integers. Typically, n, n1, m are each independently from about 1 to about 200. In another refinement of this variation, n, n1, m are each independently from 1 to 60. In still another refinement of this variation, n, n1, m are each independently from 1 to 35. In yet another refinement of this variation, n, n1, m are each independently from 5 to 60. In yet another refinement of this variation, n, n1, m are each independently from 5 to 35.

In addition to the perfluorocyclobutane monomer unit having a linking group, other monomer units may also be incorporated in the main polymer chain. The main polymer chain being the polymer less the pendant side groups. Any monomer units that can provide hydrophobicity and good mechanical properties may be incorporated into the main polymer chain. Different monomer units may be incorporated to produce a random copolymer, block copolymer, branched polymer or crosslinked polymer main chain configuration.

The sulfonated condensation polymer side chain may carry high local concentration of sulfonic acid groups to provide a domain of high proton conductivity. Concentration of sulfonic acid groups may be experimentally determined or calculated in terms of ion exchange capacity (IEC), in the unit of milliequivalent per gram (meq/g). IEC of a known polymer structure may be calculated by simply dividing the number of sulfonic acid groups per repeating monomer unit by the formula weight of the repeating monomer unit, and multiplying the result by 1000. The experimental procedure for determining IEC is fully described in U.S. Pat. No. 7,094,851, which is incorporated here by reference in its entirety. A high IEC value is desirable for high proton conductivity especially at low humidity or low hydration level in a fuel cell membrane. At low relative humidity, water must be utilized efficiently requiring protogenic groups (typically, sulfonic acid groups in this case) to be in close proximity such that minimal amount of water is required to span the distance among neighboring protogenic groups for proton migration across the polymer material. In one embodiment, local IEC of the sulfonated condensation polymer side chain is at least 2.0 meq/g. In another embodiment, the IEC for the local sulfonated condensation polymer side chain is at least 4.0 meq/g. IEC of the graft polymer may vary from about 1 meq/g to about 6 meq/g depending on the type of main chain polymer, and the molecular weight of the side chain relative to that of the main polymer chain. The graft polymer can maintain good mechanical strength at high relatively humidity and high proton conductivity at low relative humidity at a IEC value greater than about 2.0 meq/g.

Figure 23:
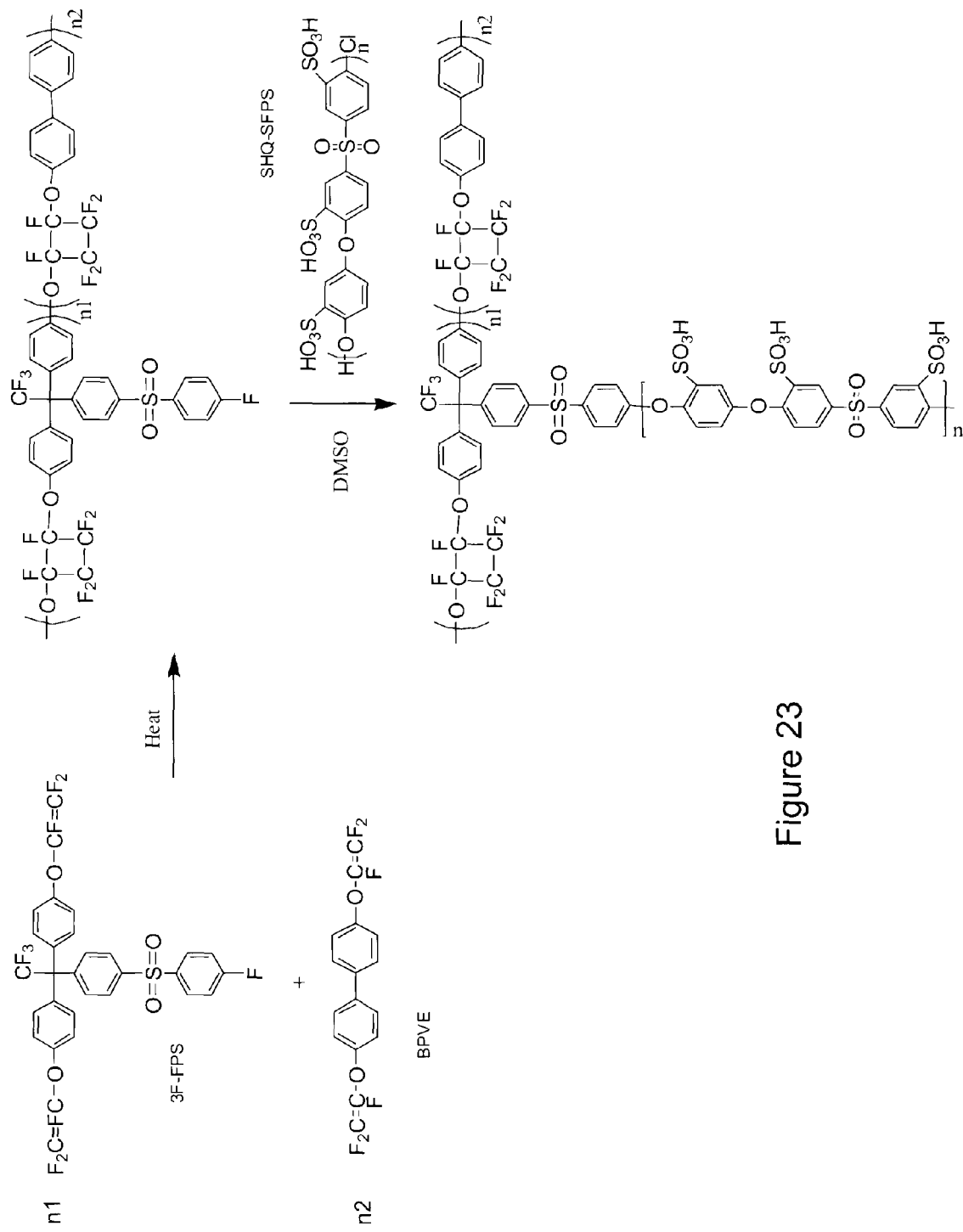
FIG. 23 provides an example of synthetic route for preparing a sulfonated graft polymer.

FIG. 23 describes an example of synthetic route for preparing a sulfonated graft polymer. A bis(trifluorovinylether) monomer with a 4-fluorophenylsulfone linking group, is mixed with a hydrophobic monomer 4,4'-bis(4-trifluorovinyloxy)biphenyl (BPVE). In this figure, n, n1, n2 are positive integers that are typically from 1 to 100. The two monomers are heated to a temperature between 140° C. and 210° C. under nitrogen blanket to yield a hydrophobic perfluorocyclobutane main chain copolymer through a thermal cycloaddition reaction. The main chain copolymer and a 1.1 equivalent amount of $K_2CO_3$ (based on the molar amount of 4-fluorophenylsulfone group) are added to the DMSO solution of the sulfonated condensation polymer having a phenol end group. The phenol end group of the sulfonated condensation polymer is slightly greater than the stoichiometric amount relative to that of the 4-fluorophenylsufone group of the main chain polymer. The reaction mixture is stirred until sufficient amount of a graft polymer is formed through the substitution reaction between the phenol end group and the 4-fluorophenylsulfone group. The graft polymer is then collected through standard workup. The IEC value of such graft polymer can be readily varied by adjusting the molar ratio of starting materials used. Table 1 lists the calculated IEC values of the graft polymers shown in FIG. 23 at various molar ratios of 3F-FPS:BPVE:SHQ-SFPS, or ratio of n1:n2:n. The formulae weights of BPVE, 3F-FPS, and SHQ-SFPS are 346, 643 and 564 respectively.

TABLE 1

IEC values of the graft polymer in FIG. 23 at different monomer ratios.

| | Molar ratio of n1:n2:n | | | | |
|---|---|---|---|---|---|
| | 1:0:1 | 1:1:1 | 1:1:2 | 1:1.5:2 | 1:2:2 |
| Calculated IEC value, meq/g | 2.49 | 1.93 | 2.83 | 2.62 | 2.44 |

The sulfonated proton conductive graft polymer according to this invention can assemble into certain morphologies where the hydrophobic main chain and the sulfonated condensation polymer side chain segregate to form interconnected hydrophobic domains and sulfonated proton conductive domains. The two different domains are interconnected through the polymer chain structures. The hydrophobic domain provides good mechanical properties and dimensional stability under a wide range of hydration levels and temperatures. The sulfonated side chain domain, having high local IEC value, provides high proton conductive channels even at low relative humidity and high temperatures. This morphological feature renders the sulfonated graft polymer an improved material for proton conductive membranes and binder material in membrane electrode assemblies for fuel cell applications.

The morphology formed from the graft copolymer, for example, may range from homogeneous without detectable phase separations to lamellar, bi-continuous, rod, sphere, and fibrous shapes, depending on processing conditions and specific structures of the polymer chain. In one embodiment, the sulfonated side chain domain forms a continuous pathway across the membrane. Such morphology allows high ionic conductivity across the membrane. The hydrophobic domain of the perfluorocyclobutane polymer main chain may assemble into a continuous or discontinuous phase.

The graft polymer may be readily processed into membranes, coatings, solutions, paste, dispersions, pellets, powder, and the like. The graft polymer can be dissolved in certain common organic solvents. A resin solution or dispersion may be prepared by dissolving or dispersing the block copolymer in a suitable solvent. A proton conductive membrane can be formed by casting the resin solution or dispersion into a thin film or by coating the resin on a substrate followed by evaporation of the solvent. The resin solution may also be used as a binder resin in place of NAFION® resin or in combination with NAFION® resin in preparing a membrane electrode assembly. Membrane electrode assemblies (MEA) may be prepared using the graft polymer resin solutions or dispersions according to the procedures disclosed in U.S. Pat. No. 5,316,871 and U.S. Pat. No. 6,521,381, which are incorporated herein by reference in their entirety. Alternatively, the block copolymer may be processed into membranes by thermal forming, calendaring, injection molding, blow molding, extrusion coating, thermal spray, and other thermoplastic processing methods known to an ordinary skill in the art.

The sulfonated graft polymer can be blended with other homopolymers or copolymers before forming a proton conductive membrane or a fuel cell membrane electrode assembly. The sulfonated graft polymer may also be used as a compatibilizer or a stabilizer to allow uniform blend of hydrophobic and hydrophilic components in a formulation for proton conductive membranes and membrane electrode assemblies.

Figure 24:
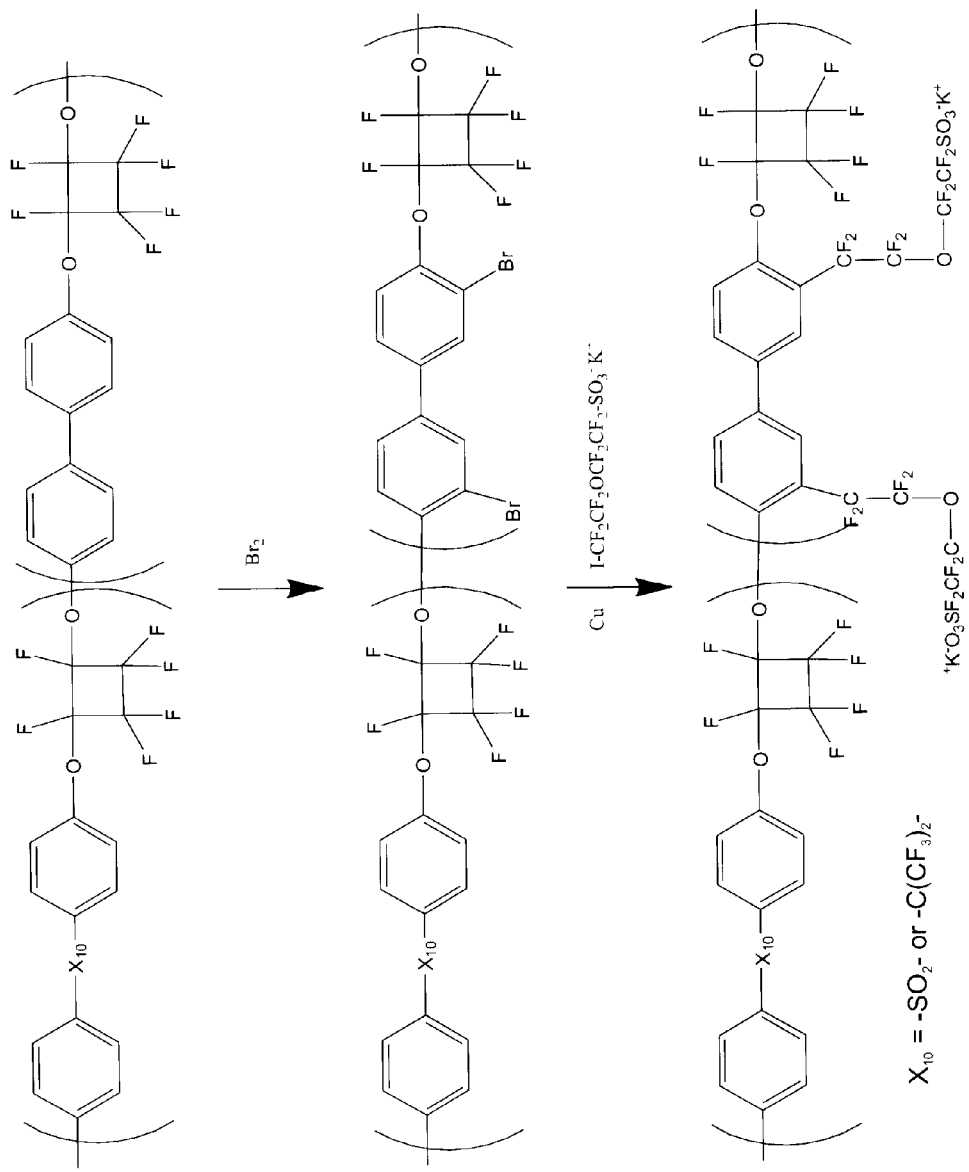
FIG. 24 provides a synthetic route to attach perfluorosulfonic acid pendant groups to the perfluorocyclobutane polymer.

FIG. 24 describes poly(perfluorocyclobutanes) [PFCBs] with pendant perfluorosulfonic acid groups made by first brominating PFCB polymers (with bromine and iron catalyst) followed by Ullmann coupling of I—$CF_2CF_2$—O—$CF_2CF_2SO_3^{-1}$ $K^+$ with copper to prepare polymers with between 1 and 2 meq $H^+/g$ ion exchange capacity. Sumitomo has patented a method to attach PFSA pendant groups to a variety of hydrocarbon polymers (in US2003180596A), but the method is not applied to PFCB polymers. These polymers show excellent low relative humidity fuel cell operation because of the super acid groups attached to the polymer backbone. As PFCB polymers are advantaged compared to standard hydrocarbon polymers permitting higher IEC prior to rendering the ionomer water soluble and increasing the hydrophobicity of the non-proton conducting phases thereby increasing the utilization of water.

The above description of embodiments of the invention is merely exemplary in nature and, thus, variations thereof are not to be regarded as a departure from the spirit and scope of the invention.

EXAMPLES

Sulfonated Fluorobenzophenone. A 250-mL round-bottom, 3-necked flask equipped with a condenser, mechanical stirrer, argon inlet, and glass stopper is situated in a silicone oil bath. 4-Fluorobenzophenone (25 g) and 30% oleum (40 mL) is added with stirring and heated at 110° C. for 8 hours. The solution is added to ice water (300 mL) and then salt is added (150 g). The white solid is filtered onto polypropylene filter cloth and added to water (200 mL). The solution is neutralized with sodium hydroxide and the product is salted out with sodium chloride (141 g) and is filtered. The white solid is recrystallized from 50 wt. % methanol and water in a freezer. (*Macromolecules*, 41, 2126, 2008.) 1,1-Bis(4-hydroxyphenyl)-1-((4-fluorophenyl)thio)phenyl-2,2,2-trifluoroethane.

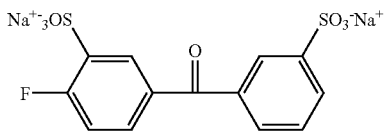

This title molecule is prepared according to *Macromolecules*, 39, 6990, 2006).

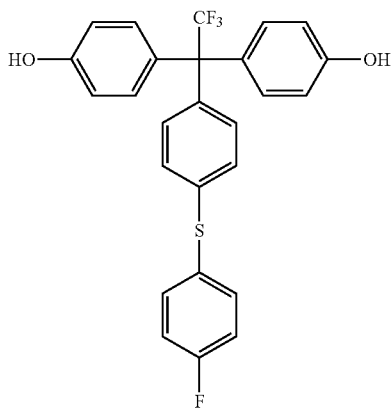

Oxidation of 1,1-Bis(4-hydroxyphenyl)-1-((4-fluorophenyl)thio)phenyl-2,2,2-trifluoroethane. The sulfone is made with hydrogen peroxide as described in *Macromolecules*, 39, 6990, 2006 or *Macromolecules*, 41, 2126, 2008.

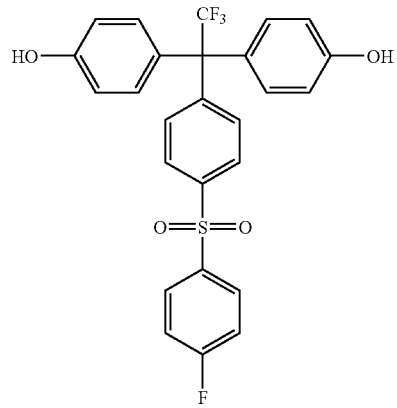

1,1-Bis(4-trifluorovinyloxyphenyl)-1-((4-fluorophenyl)thio)phenyl-2,2,2-trifluoroethane. The bis(perfluorovinyl ether-compound is made from the bis(2'-bromotetrafluoroethoxy) derivative as follows. To a 100-mL flask equipped with a Barrett trap is added the bisphenol (43.75 mmol), KOH (87.47 mmol), DMSO (50 mL), and xylene (1.2 mL). The mixture is heated at 100° C. under vacuum (0.4 mm Hg) for 48 h. At 23° C., $BrCF_2CF_2Br$ (96.22 mmol) is slowly added and the mixture is stirred for 24 h at 23° C. Water is added and the mixture is extracted with $CH_2Cl_2$. The organic layer is dried over $MgSO_4$ and the volatiles removed under vacuum to yield the bis(bromotetrafluoro ether) compound. This product (34 mmol) is added dropwise to a stirred mixture of zinc (75.02 mmol) in acetonitrile (60 mL) at 80° C. The mixture is refluxed for 8 hours, the solvent is removed under vacuum, and the residue is then extracted with toluene (methylene chloride or hexanes) and dried over $MgSO_4$. The solution is concentrated and passed through a silica column with 1:1 hexanes and toluene. Evaporation of the solvent yielded a white solid.

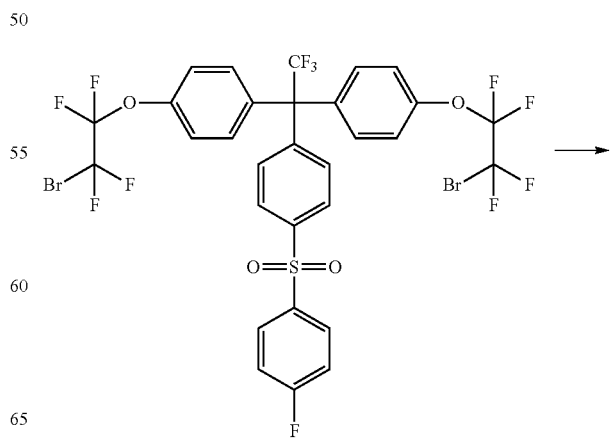

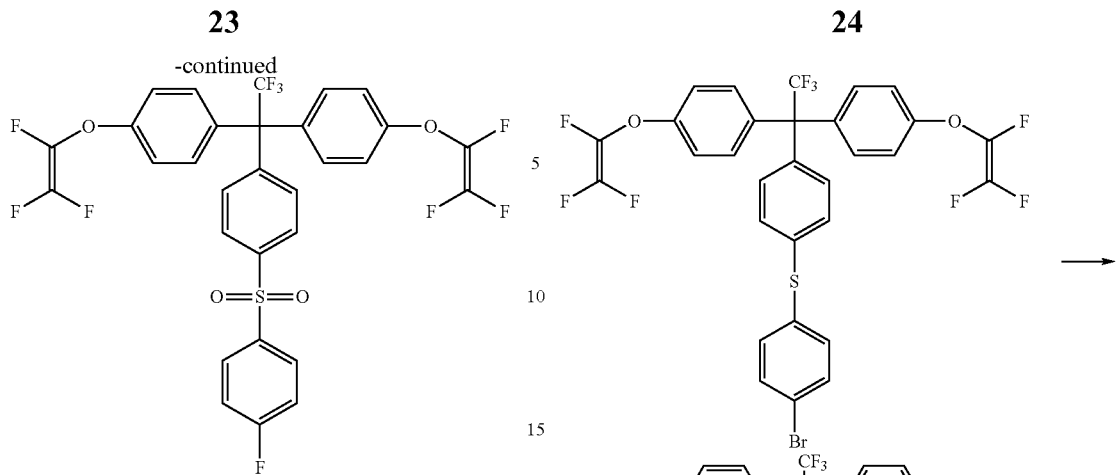

The thio-derivative is prepared similarly.

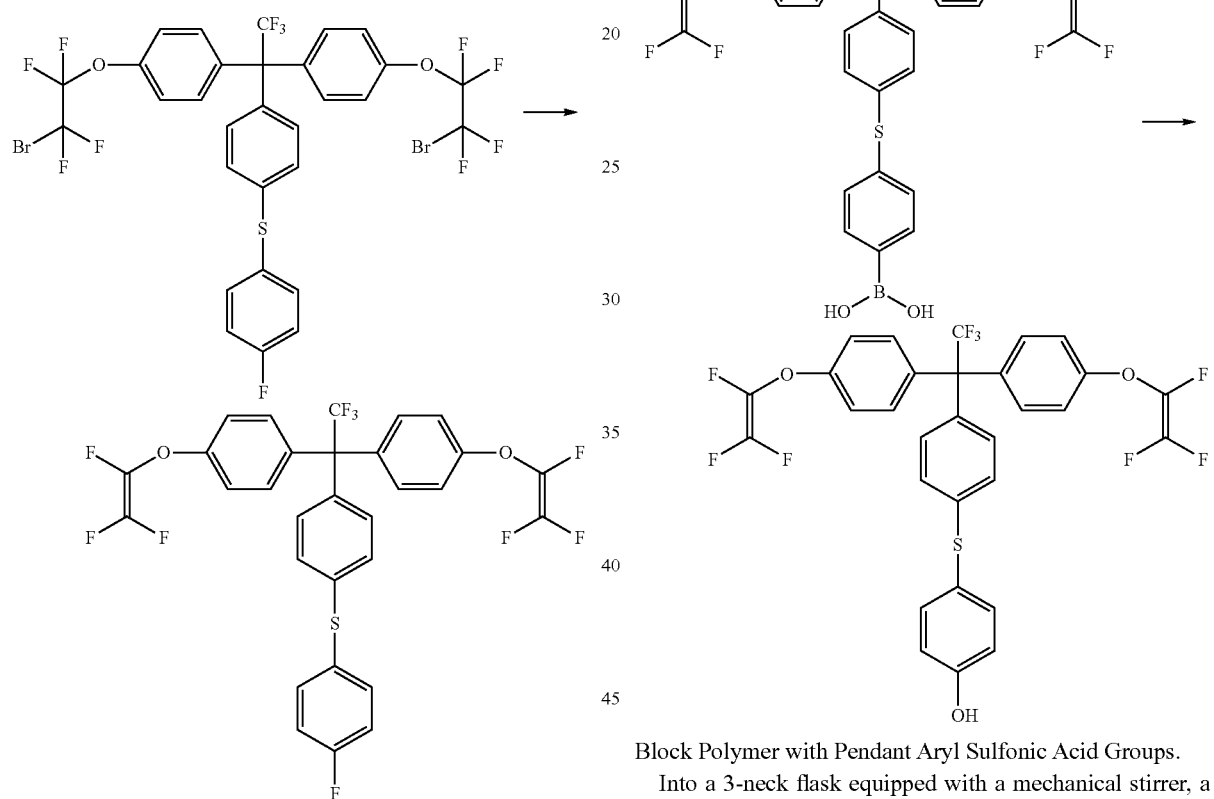

1,1-Bis(4-trifluorovinyloxyphenyl)-1-((4-phenylboronic acid)thio)phenyl-2,2,2-trifluoroethane. To a solution of 1,1-bis(4-trifluorovinyloxyphenyl)-1-((4-bromophenyl)thio)phenyl-2,2,2-trifluoroethane (16.94 mmol) in dry ether at −78° C. under argon is added by syringe t-butyllithium (20.33 mmol) in pentane. After 1 h at −78° C., a solution of trimethylborate (20.33 mmol) in ether (20 mL) is added dropwise and the reaction is allowed to warm to 23° C. After 4 h, 5 wt. % HCl is added and the reaction mixture is washed with water. The organic phase is dried over $MgSO_4$ and the solvent is evaporated. Aqueous $H_2O_2$ (30%, 4 mL) and water (40 mL) is added to some of the reaction residue (13.31 mmol) in air with stirring for 24 h at 23° C. The reaction mixture is extracted with ether, and the ether layer is washed with water and dried over $MgSO_4$. After solvent removal, the residue is purified by column chromatography with silica gel and elution with hexane and ethyl acetate (3:1) to yield the phenol derivative.

Block Polymer with Pendant Aryl Sulfonic Acid Groups.

Into a 3-neck flask equipped with a mechanical stirrer, a Barrett trap, condenser, and argon inlet is added bis(4-fluoro-1-phenyl)sulfone (10 mmol), hydroquinone methyl ether (5 mmol), para-bisphenol (5 mmol), $K_2CO_3$ (12 mmol), toluene (15 mL) and NMP (15 mL). The reaction mixture is heated at 150° C. to remove the toluene and then to 175° C. (oil bath set temperature). After 16 h, the reaction mixture is added to water and the precipitated polymer is filtered, washed with methanol, and air-dried. To this polymer (1 g) in chloroform (20 mL) with stirring is added $BBr_3$ (1 mL) dissolved in $CHCl_3$ (10 mL) dropwise and the reaction is stirred for 8 more hours. The polymer is isolated by filtration, washed with water and methanol, and then air-dried. This polymer (1-mmol of hydroxyl groups) is then allowed to react with the bis(sulfonated-fluorobenzophenone) (2 mmol) in DMAc (20 mL), $K_2CO_3$ (1.5 mmol) and toluene (10 mL) under argon first at 150° C. to remove the toluene with a Barrett trap, and then at 170° C. for 24 h. The reaction mixture is added to 5 wt. % hydrochloric acid and then washed extensively with water. The filtered polymer is then air-dried.

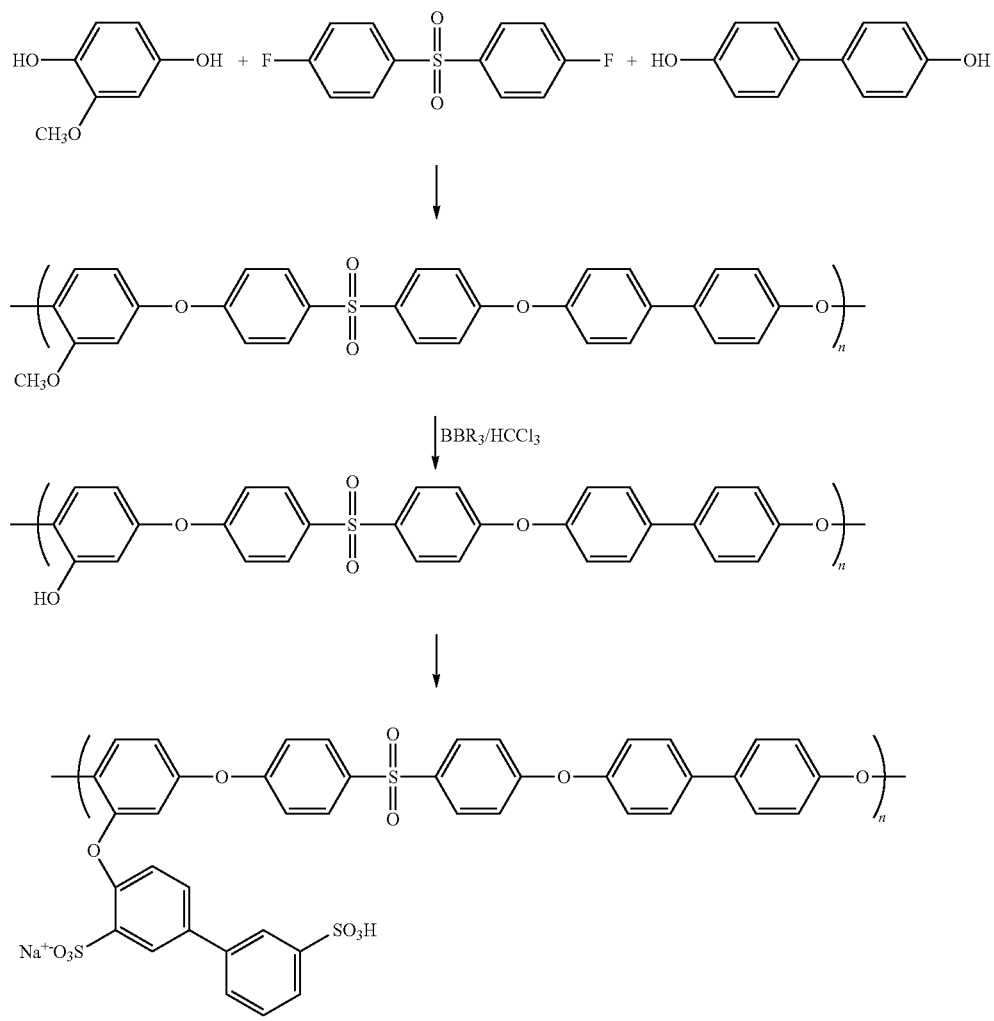

Synthesis of Perfluorocyclobutane (PFCB) Polymers with Perfluorosulfonic Acid (PFSA) Pendant Groups. Sumitomo has patented a method to attach PFSA pendant groups to a variety of hydrocarbon polymers (in US2003180596A), but the method is not applied to PFCB polymers. Poly(perfluorocyclobutanes) [PFCBs] with pendant perfluorosulfonic acid groups is made by first brominating PFCB polymers (with bromine and iron catalyst) followed by Ullmann coupling of $I-CF_2CF_2-O-CF_2CF_2SO_3^{-1}$ $K^+$ with copper to prepare polymers with between 1 and 2 meq $H^+/g$ ion exchange capacity. The resultant polymers is dissolved in N,N-dimethylacetamide (DMAc) and then solution cast and dried at 80° C. to produce durable PEMs that perform at 95° C. and 20% relative humidity. The polymer structure is shown below:

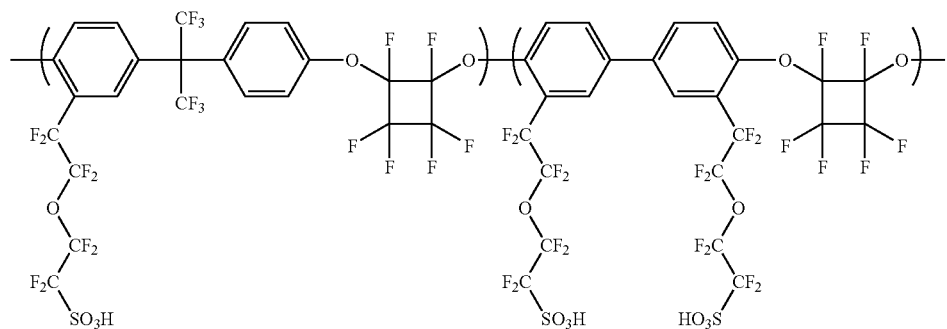

Preparation of the PFCB Polymer

Diphenyl ether (DPE) solutions of 6F (monomer, 30 g in 30 g DPE) and BPVE-oligomer (Mn=8,000, 60 g in 60 g DPE) is mixed together and degassed with Ar for about 1 hour at 75° C. The reaction mixture is then stirred (12 rpm) at 160° C. overnight. The reaction mixture is then heated as follows: 180° C. overnight, 200° C. for 3 hours, 220° C. for 6 hours, 230° C. overnight while continually stirring at 12 rpm and finally 240° C. for 4 hours. The reaction is carried out in a 1-L stainless steel reactor with mechanical stirring (stainless steel stirrer rod and a Teflon blade) and condenser. At the end of the reaction, the viscous solution is cooled to 60° C. and diluted in THF (270 g, 25 wt % solids) at 60° C. with increased stirring speed. The polymer solution in THF is filtered through a Teflon mesh filter cloth and precipitates by slowly pouring into methanol (4 L) while agitating with a glass rod. The cloudy methanol is decanted away and replaced with fresh methanol (2 L). This mixture is stirred and allowed to stand for 1 hour to remove any residual THF, DPE and low molecular weight oligomers trapped in the precipitated polymer. The methanol is decanted away and the polymer dried under vacuum at 60° C. Soxhlet extraction is performed with methanol to remove traces of DPE from the copolymer.

Bromination of PFCB Polymer. To a 250-mL flask at 25° C. is added the PFCB polymer (5.3 g, 4.46 mmol) described above in methylene chloride (100 mL) and 0.0.274 g of iron powder. Bromine (3.44 g, 21.5 mmol) is added dropwise while maintaining the temperature below 28° C. The solution is stirred for 16 h and then the reaction mixture is washed with saturated aqueous hyposulfite and then twice with water. The methylene chloride fraction is concentrated using a rotary evaporator and added to methanol (1 L) using a Waring blender. The off white polymer is filtered, air-dried and analyzed to have 26.4 wt. % Br.

Figure 25:
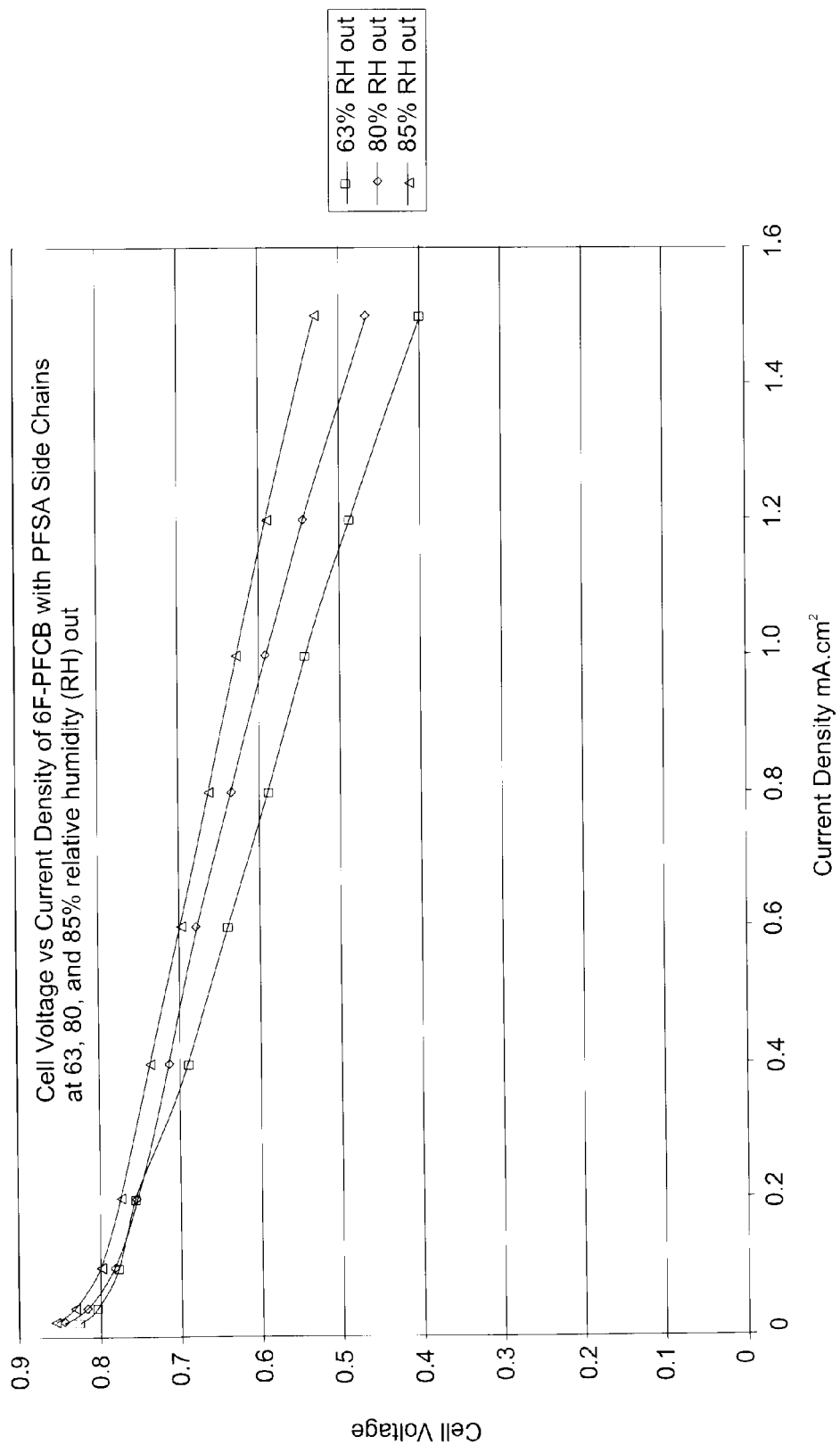
FIG. 25 provides Cell Voltage vs Current Density of PFCB Polymer with Pendant PFSA Groups.

Attachment of Pendant PFSA Groups. A 250-mL Schlenk flask is equipped with a condenser, argon inlet, magnetic stir bar, and a rubber septum. The brominated PFCB polymer (2 g) in 10% dry DMSO and 90% dry DMF (20 g) and copper powder (2.2 g) is treated with an excess of $ICF_2CF_2OCF_2CF_2SO_3^-K^+$ (5 g, prepared as described in US Patent 2003/0180596A, Sep. 25, 2003) that is added slowly to the reaction mixture with vigorous stirring at 120° C. After 3.5 h, the reaction appeared to become homogeneous. The reaction mixture is allowed to proceed for 24 hours and then after cooling to 23° C. dilute hydrochloric acid is added. The polymer residue is filtered off, dried, and dissolved in N,N-dimethylacetamide (15 mL). After pressure filtration through a 5-micrometer Millipore Teflon filter, the solution is coated onto glass with a 4-mil Bird applicator (Paul N. Gardner, Pompano Beach, Fla.) and is dried at 80° C. The film is floated off the glass and immersed in 2M sulfuric acid for 16 h. After thorough washing with water, the 14-micrometer film has an ion exchange capacity of 1.1 meq $H^+/g$ as determined by titration with 0.0108 M sodium hydroxide and is determined to have 2.98 wt. % residual bromine in the polymer. The film is evaluated as a polyelectrolyte membrane in a hydrogen-air fuel cell using 0.4 mg/cm²-platinum on carbon (Tanaka) catalyst electrodes coated on carbon fiber diffusion media with a sintered-Teflon particle, microporous layer. Fuel cell results are summarized in the FIG. 25. Fuel cell operating conditions are as follows (anode/cathode): 85% relative humidity outlet streams—3/3 $H_2$/air stoichiometries, 50%/50% RHinlets, 80° C., 75 kPa; 80% relative humidity outlet streams—2/2 $H_2$/air stoichiometries, 35%/35% RHinlets, 80° C., 50 kPa; and 80° C., 75 kPa; 63% relative humidity outlet streams—3/3 $H_2$/air stoichiometries, 32%/32% RHinlets, 80° C., 50 kPa. FIG. 25 provides Cell Voltage vs Current Density of PFCB Polymer with Pendant PFSA Groups.

A PFCB-Polysulfone Block Polymer with the following structure is made following the procedure described above, except that a bis(trifluorovinyloxyphenyl)sulfone groups replaced the bis(trifluorovinyloxyphenyl)hexafluoropropane groups in the preparation:

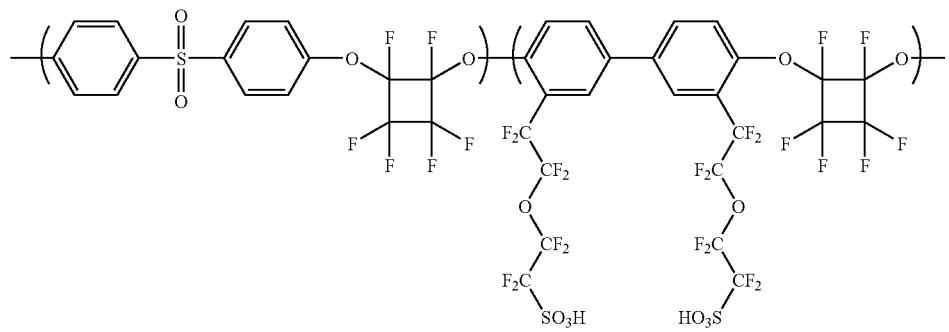

Figure 26:
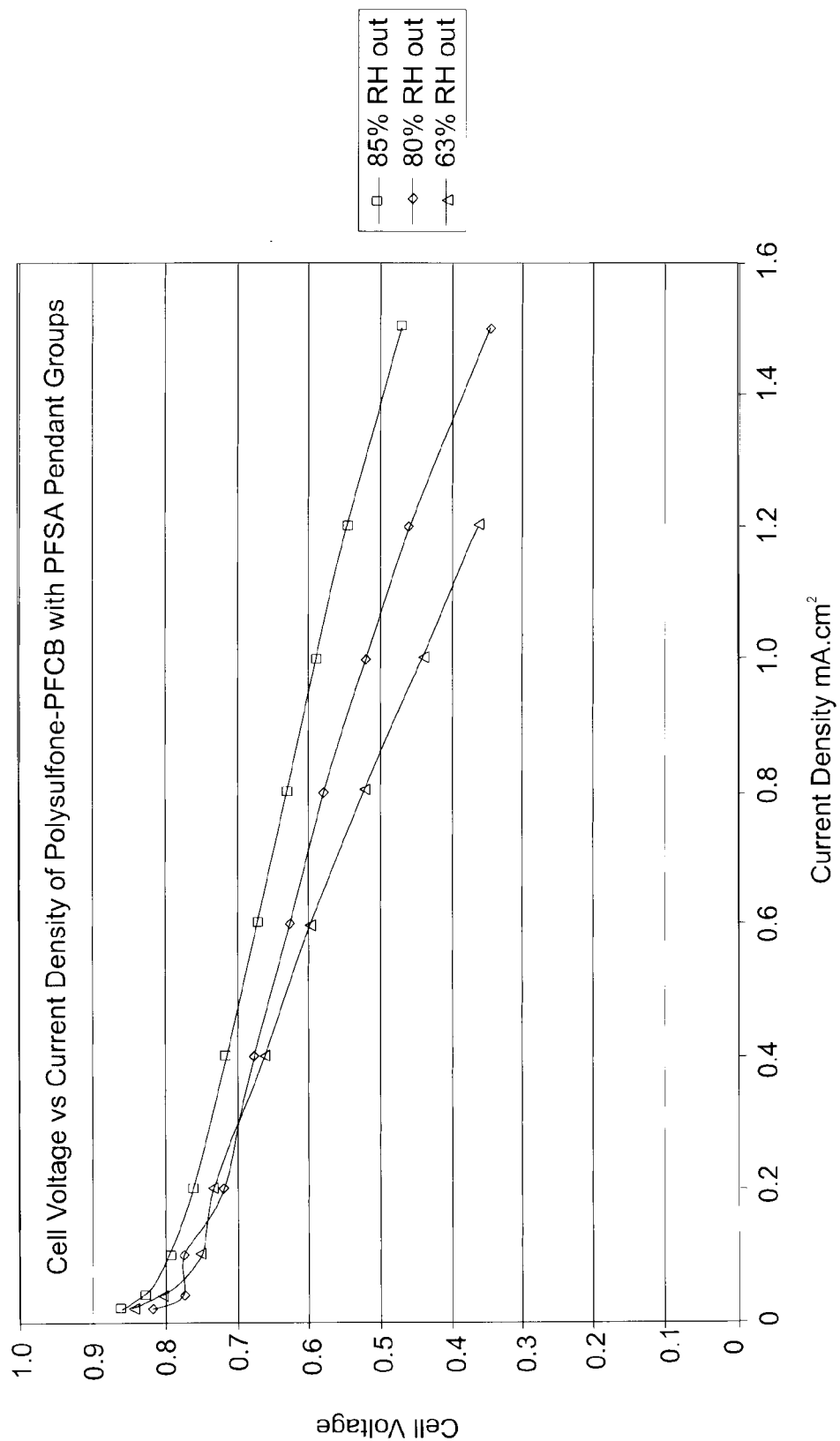
FIG. 26 provides Cell Voltage vs Current Density of a Sulfone-PFCB Polymer with Pendant PFSA Groups.

The film produced has an ion exchange capacity of 1.5 meq $H^+/g$ as determined by titration with 0.0108 M sodium hydroxide. When evaluated in a hydrogen-air fuel cell, the results shown in the FIG. 26 are obtained. FIG. 26 provides Cell Voltage vs Current Density of a Sulfone-PFCB Polymer with Pendant PFSA Groups.

Attachment of Pendant —$(CH_2)_n SO_3 H$ Groups to PFCB Polymers. The attachment of alkyl sulfonic acid groups to aromatic, non-PFCB polymers is described in US Patents 2003/0096149A1 (May 22, 2003) and U.S. Pat. No. 6,670,065 (Dec. 30, 2003).

Preparation of Sulfopropyl-PFCB Polyelectrolyte Membrane. Under argon and with mechanical stirring, nitrobenzene (50 mL), propanesultone (5 g, 0.041 mol) and the 8,000-Mn-BPVE-6F-PFCB polymer (5 g) is placed in a 500-mL, 3-neck flask equipped with a condenser. Anhydrous aluminum chloride (5.6 g) is added portionwise to the mixture over 30 minutes and then, after complete addition, the mixture is boiled at reflux for between 8 and 30 h. The reaction mixture is added to water (1 L) and the insoluble polymer is filtered, washed extensively with water, and dried to yield sulfopropyl-PFCB polymer. Alternatively, the PFCB-polymer (5 g) is placed in dry chloroform (150 mL) and heated at 60° C. Propanesultone (3 g) is added, and then anhydrous aluminum chloride (3.1 g) is added with stirring over 30 minutes. The resulting mixture is then heated for 15 hours at 50° C. The precipitated polymer is washed with chloroform (150 mL) and then dried. The polymer is then washed four times with water (250-mL each washing) using a Waring blender, and then is air-dried.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A polymer that is useful for fuel cell applications, the polymer comprising segments 1 and 2:

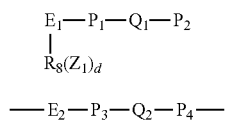

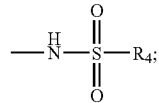

wherein:

$Z_1$ is —$SO_2X$, —$PO_3H_2$, or —COX;

$E_1$, $E_2$ are each independently an aromatic-containing and/or aliphatic-containing moiety;

X is an —OH, a halogen, an ester, or $$-\overset{H}{N}-\overset{\overset{O}{\|}}{\underset{\underset{O}{\|}}{S}}-R_4;$$

d is the number of $Z_1$ attached to $E_1$;

$P_1$, $P_2$, $P_3$, $P_4$ are each independently: absent, —O—, —S—, —SO—, —CO—, —$SO_2$—, —NH—, $NR_2$—, or —$R_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$R_8(Z_1)_d$ is a moiety having d number of protogenic groups; and $Q_1$, $Q_2$ are each independently a fluorinated cyclobutyl moiety.

2. The polymer of claim 1 wherein the polymer comprises a polymer having polymer units 3 and 4:

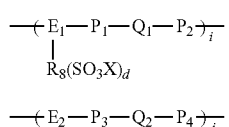

i is a number representing repetition of polymer segment 1 to define a polymer unit 3; and j is a number representing repetition of polymer segment II to define polymer unit 4.

3. The polymer of claim 2 wherein i and j are each independently an integer from 1 to 400.

4. The polymer of claim 1 wherein d is equal to the number of aromatic rings in $E_1$.

5. The polymer of claim 1 wherein d is an integer from 1 to 4.

6. The polymer of claim 1 wherein $Q_1$ and $Q_2$ are each independently a perfluorocyclobutyl moiety.

7. The polymer of claim 1 wherein $Q_1$ and $Q_2$ are each independently:

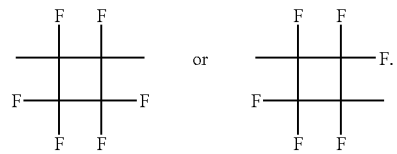

8. The polymer of claim 1 wherein E1 and E2 are each independently selected from the group consisting of:

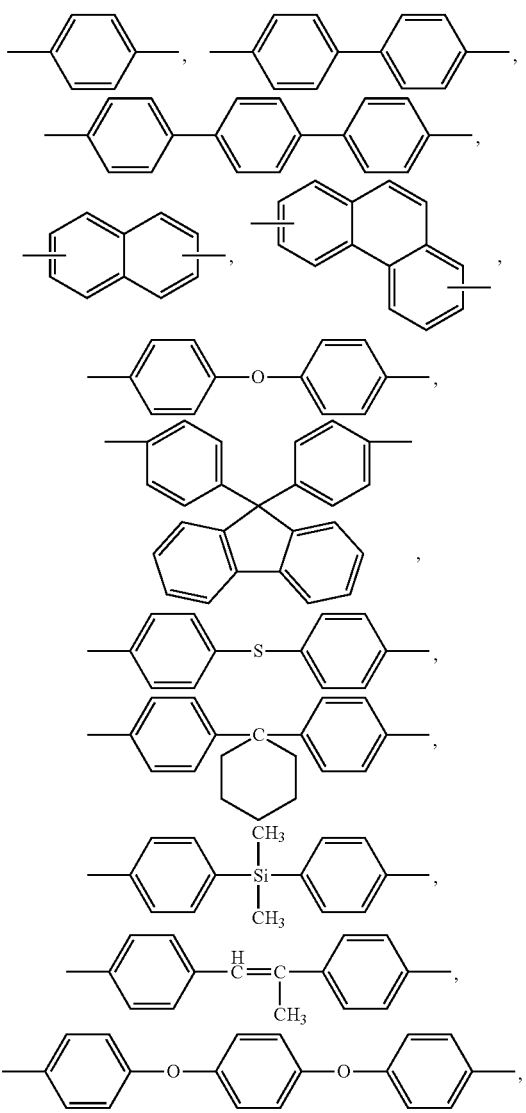

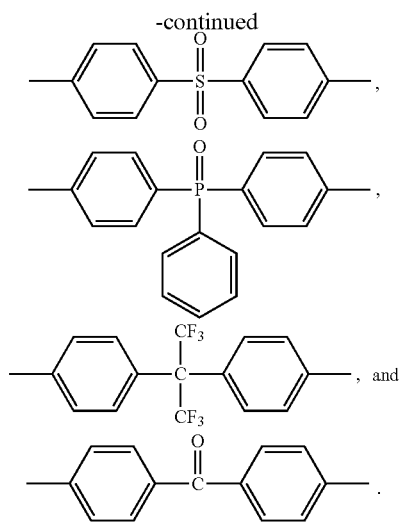
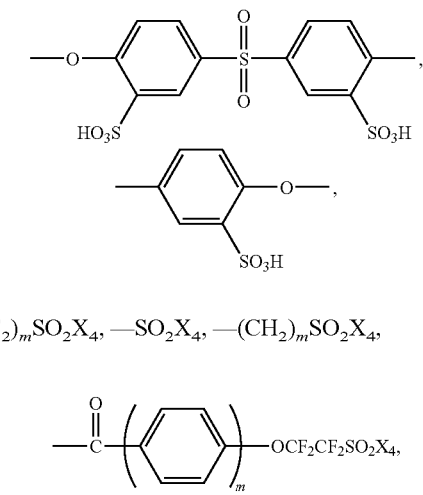
wherein m is a positive integer and $X_4$ is —OH or a halogen atom.
9. The polymer of claim 1 having the following formula:
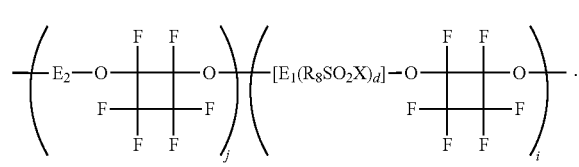
10. The polymer of claim 1 wherein $R_8$ comprises a chemical structural unit selected from the group consisting of:
11. The polymer of claim 1 wherein $R_8$ comprises a chemical structural unit selected from the group consisting of:
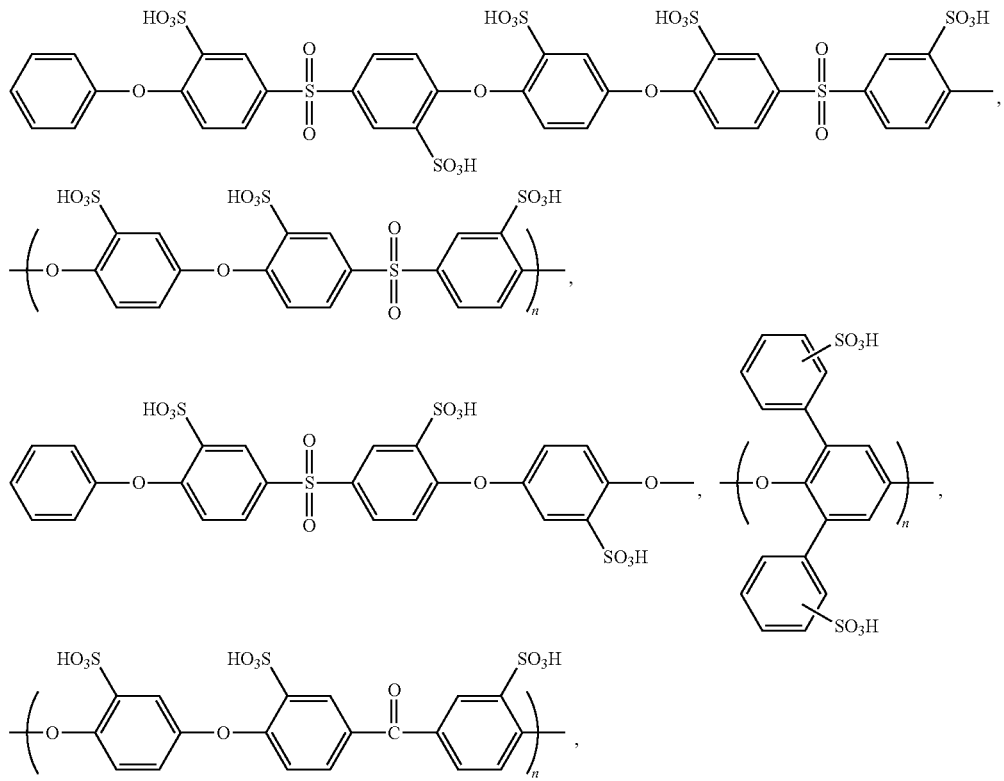

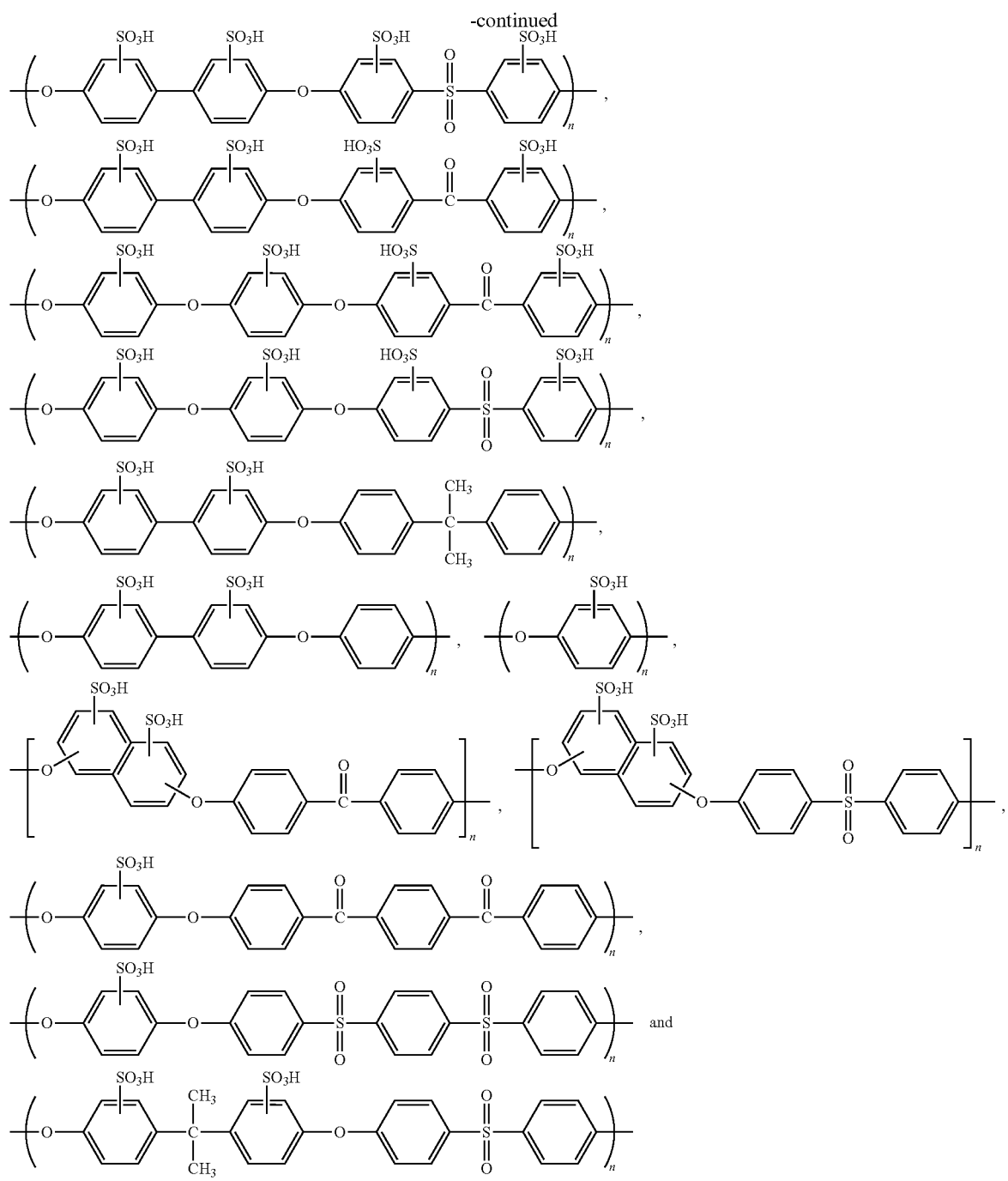
wherein n is an integer.
12. A polymer membrane electrode comprising the polymer of claim 1.
* * * * *